United States Patent [19]

Holtan, Jr. et al.

[11] Patent Number: 5,009,496
[45] Date of Patent: Apr. 23, 1991

[54] EYEGLASSES AND HEADGEAR COMBINATION

[75] Inventors: Ramer B. Holtan, Jr., 5003 E. Mercer Way, Mercer Island, Wash. 98040; Kevin L. Falk, Mercer Island, Wash.; James F. Bergman, Snohomish, Wash.; James R. Smith, Kirkland, Wash.; Kenneth E. Nelson, Redmond, Wash.

[73] Assignee: Ramer B. Holtan, Jr., Mercer Island, Wash.

[21] Appl. No.: 324,202

[22] Filed: Mar. 15, 1989

[51] Int. Cl.$^5$ ................................................ B02C 3/00
[52] U.S. Cl. .................................... 351/156; 351/157; 351/123
[58] Field of Search ............... 351/123, 156, 157, 119; 2/13, 450, 452, 453, 448

[56] References Cited

U.S. PATENT DOCUMENTS

| | | |
|---|---|---|
| 207,187 | 3/1867 | Gould . |
| 869,741 | 10/1907 | Seitzman . |
| 1,532,317 | 4/1925 | Kingsbury . |
| 2,411,831 | 11/1946 | Lehmberg et al. . |
| 2,609,538 | 9/1952 | Jackson .................................... 2/453 |
| 2,907,041 | 10/1959 | Finn . |
| 3,012,248 | 12/1961 | Kleinman . |
| 3,173,147 | 3/1965 | Gross et al. . |
| 3,214,767 | 11/1965 | Weber . |
| 4,152,051 | 5/1979 | Van Tiem et al. . |
| 4,393,519 | 7/1983 | Nicastro . |
| 4,520,510 | 6/1985 | Daigle . |
| 4,549,793 | 10/1985 | Yoon . |
| 4,616,367 | 10/1986 | Jean, Jr. et al. . |

Primary Examiner—Rodney B. Bovernick
Attorney, Agent, or Firm—Seed and Berry

[57] ABSTRACT

An eyeglasses and headgear combination is disclosed. The eyeglasses may be worn alone or in combination with the headgear. The temple member of the eyeglasses is alternatively positionable behind the ear of the user or attached to the headgear. When the temple is attached to the headgear, the temple extends outward from the front of the eyeglasses at an angle different than when the temple is positioned behind the ear of the user. This provides maximum comfort for the user in both positions. The coupling to which the temple is attached may be pivoted to move the eyeglass lenses out of the user's field of vision and rest them on his head or headgear.

34 Claims, 18 Drawing Sheets

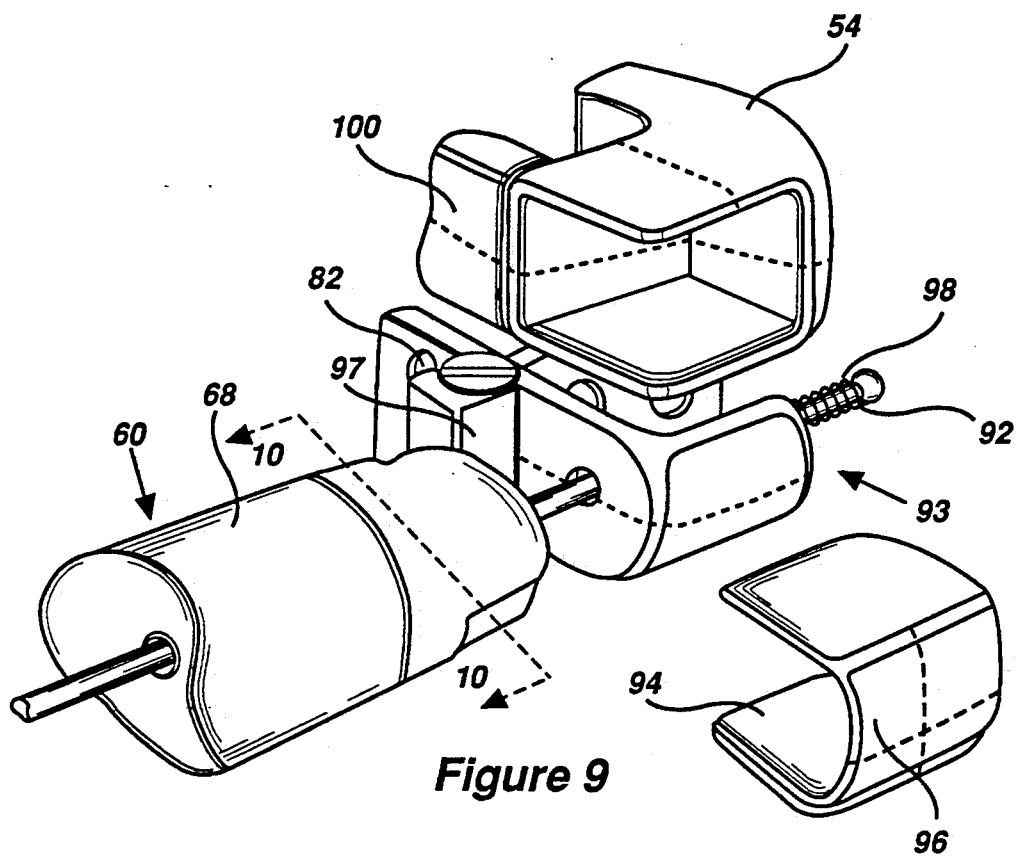
Figure 9
Figure 10
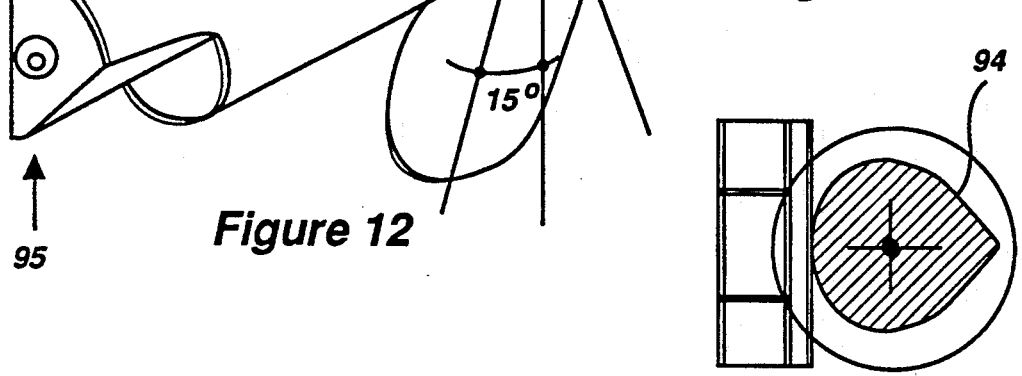
Figure 12
Figure 11

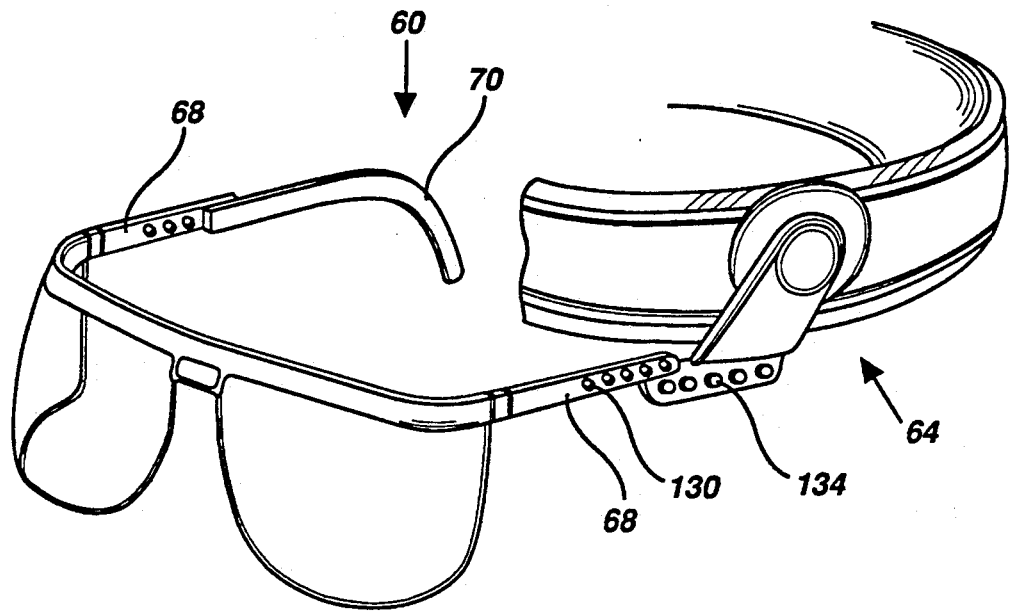
Figure 18
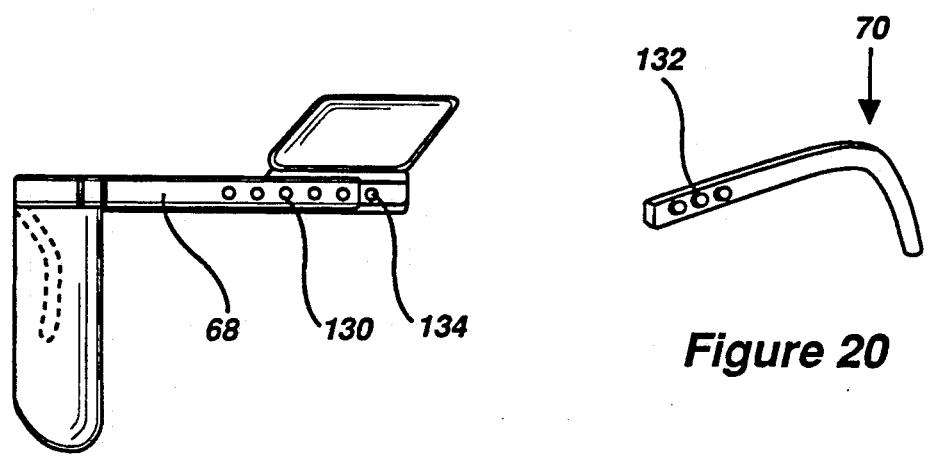
Figure 19
Figure 20

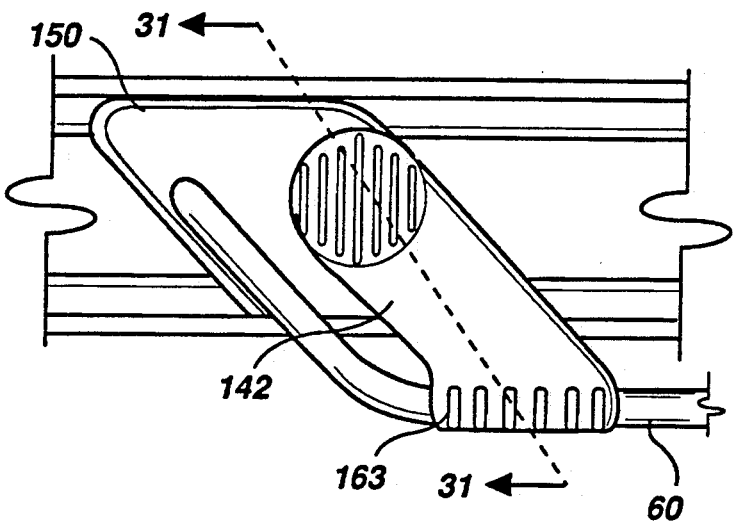
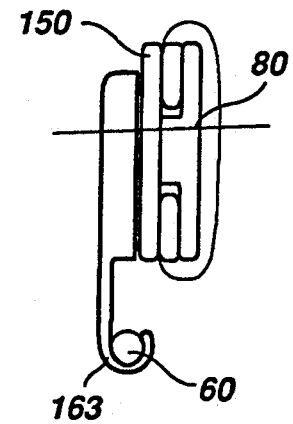
Figure 30   Figure 31
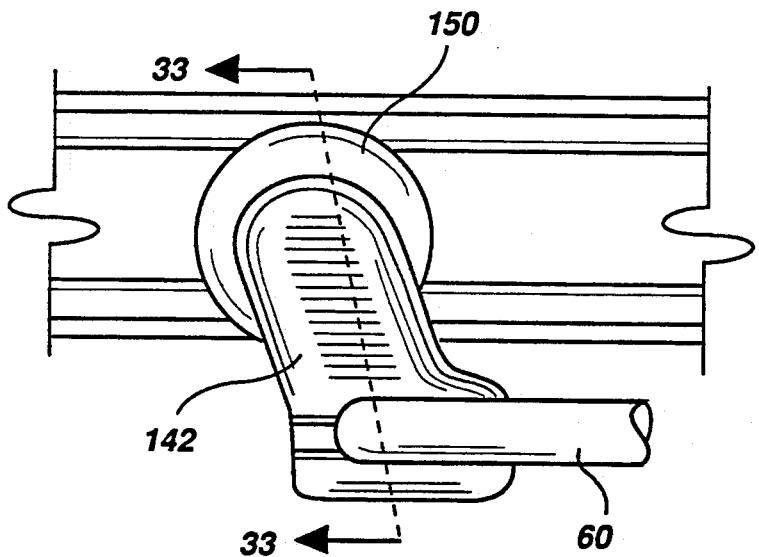
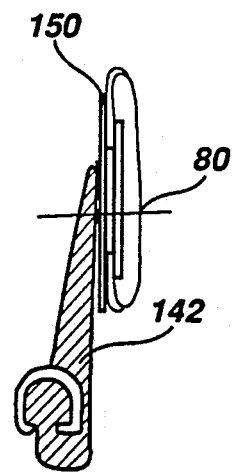
Figure 32   Figure 33
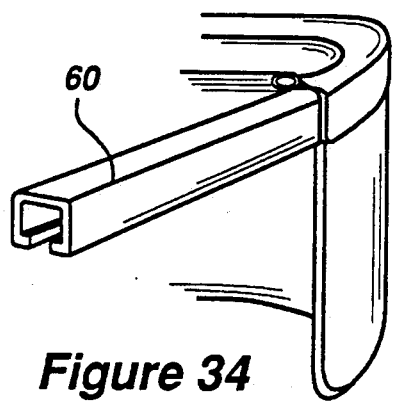
Figure 34

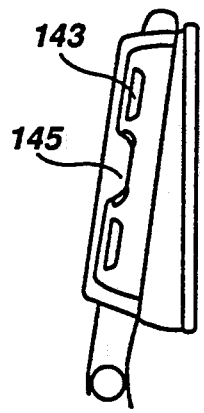
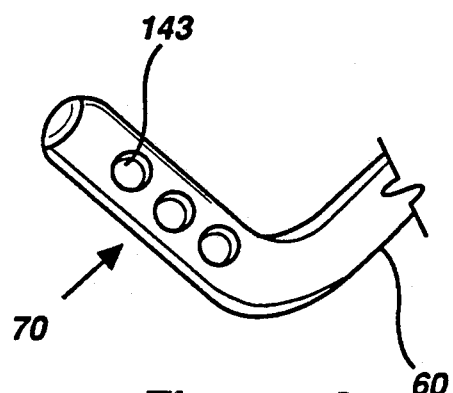
Figure 39
Figure 40
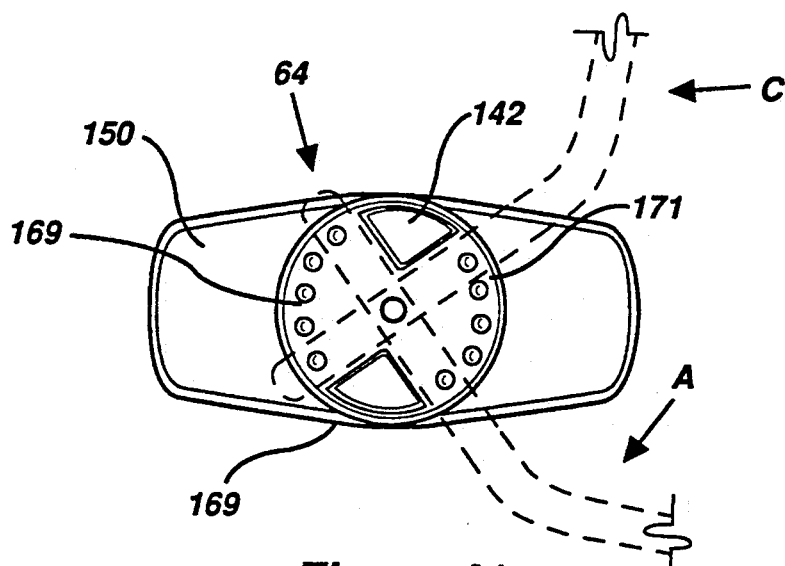
Figure 41

EYEGLASSES AND HEADGEAR COMBINATION

FIELD OF THE INVENTION

This invention relates to eyeglasses and headgear which can be used either in combination, one with another, or independent of one another.

BACKGROUND OF THE INVENTION

People engage in a wide variety of physical activities while wearing eyeglasses, either sunglasses or prescription lenses. Headgear, including headbands, caps, sweatbands or the like, are often worn during the physical activity for the comfort of the user. People often desire or need to wear eyeglasses at the same time they are wearing the headgear. The eyeglasses may be sunglasses, prescription eyeglasses or protective eyewear. On the recreational side, people often use sweatbands and sunglasses in sports activities involving perspiration and conducted out-of-doors, such as jogging, biking, rowing, tennis and the like. Similarly, mountain climbing, horseback riding, canoeing, kayaking, and other activities involve exertion and require that eyeglasses be held stable during the activity. On the vocational side, people could often use an accessory that provides stability of the eyeglasses and, at the same time, protection from perspiration interfering with the vision. For example, professionals as disparate as surgeons and iron workers have a need to be assured that their eyeglasses remain in the proper position while they work.

Present eyeglasses and headgear typically function only independent of each other. The eyeglasses are purchased at specialty shops and selected according to the taste and preferences of the user. Headbands, ear warmers, sweatbands, goggles and other headgear are purchased separately from eyeglasses according to the needs, tastes, and desires of the user. When used simultaneously, the user would usually put on the eyeglasses first and then place the headgear over the eyeglasses. Should the person need to remove the eyeglasses, such as for cleaning, adjusting or walking from the outside sunshine into the inside, it is often necessary first to remove the headgear. The headgear may also interfere with the user putting the eyeglasses back on. A further disadvantage is that the headgear may rub against the eyeglasses, creating discomfort on the part of the user which is not present when the headgear is not in use. Conversely, the eyeglasses may interfere with the function and use of the headgear. Also, traditional eyeglasses may irritate the backs of the ears and, in an active sports setting, may not remain securely in place, often sliding down the nose or even falling off.

A combination of headband and sunglasses has been proposed; see, for example, U.S. Pat. No. 4,393,519, to Nicastro, and U.S. Pat. No. 4,549,793, to Yoon. One disadvantage of the prior art eyeglasses and headgear combination is the lack of comfort provided to the user. The combination itself must be specifically positioned with respect to the eyes, nose and ears to be comfortable for the user. If not properly positioned, the eyeglasses may rub against the face of the user creating irritation and discomfort. Further exacerbating the problem of providing an eyeglasses and headgear combination is that the fit of the eyeglasses to the human face must be within very tight tolerances to be comfortable.

SUMMARY OF THE INVENTION

It is therefore an object of this invention to provide an eyeglasses and headgear combination which is comfortable to the user.

It is another object of this invention to provide an eyeglasses and headgear combination which is easily adjustable to different positions with respect to the eyes and nose of the user.

It is another object of this invention to provide eyeglasses that can be worn either alone or in combination with headgear.

It is another object of this invention to provide an eyeglasses and headgear combination in which the eyeglasses may be moved upward, out of the user's field of vision.

It is another object of this invention to provide an eyeglasses and headgear combination in which the eyeglasses are securely and properly positioned before the eyes during any manner of activity or exertion.

It is another object of this invention to provide an eyeglasses and headgear combination in which the principal components are aesthetically pleasing.

These and other objects of the invention as described herein are accomplished by providing an eyeglasses and headgear combination attachable to the head of the user. The eyeglasses include a front member and a temple member. The front member retains the lenses and the bridge member. The temple member is alternatively positionable for attachment to the headgear or behind the ear of the user. The eyeglasses are pivotally coupled to the headgear to permit the user to position the eyeglasses alternatively in front of his eyes or above his eyes, out of his line of sight. The angle of the temple member with respect to the front member is greater when the temple member is positioned for attachment to the headgear than when it is positioned for use behind the ear. The greater angle with respect to the front member facilitates attachment of the temple member to the headgear, reduces stress on the temple member and the eyeglasses as a whole and relieves pressure on the ears, nose and temples of the user. These advantages are attainable without loss of fit and comfort when the temple members are positioned for use behind the ears.

BRIEF DESCRIPTION OF THE DRAWINGS

FIG. 9 is an isometric, exploded view of an alternative embodiment of the temple member rotatably coupled to the front member.

FIG. 10 is a cross-sectional view of the cam of the temple member of FIG. 9 taken along lines 10—10.

FIG. 11 is a cross-sectional view of an alternative embodiment of the cam of FIG. 9.

FIG. 12 is an isometric view of an alternative embodiment of the cam portion of a temple member.

FIG. 18 is an isometric view of an alternative embodiment of a temple member coupling to the headgear.

FIG. 19 is a side elevational of FIG. 18.

FIG. 20 is an isometric view of the tip member of the eyeglasses of FIG. 18.

FIG. 30 is an alternative embodiment of the coupling member attached to the headgear and the temple of the coupling member.

FIG. 31 is a cross-sectional view taken along lines 31—31 of FIG. 30.

FIG. 32 is a side elevational view of an alternative embodiment of the coupling mechanism attached to the headgear.

FIG. 33 is a cross-sectional view taken along lines 33—33 of FIG. 32.

FIG. 34 is an isometric view of the temple member of the embodiment of FIG. 32.

FIG. 39 is a cross-sectional view of an alternative embodiment of a coupling member.

FIG. 40 is an isometric view of the temple tip for use with the coupling member of FIG. 39.

FIG. 41 is a side elevational view of an alternative embodiment of the coupling member of FIG. 39.

DETAILED DESCRIPTION OF THE INVENTION

Figure 1:
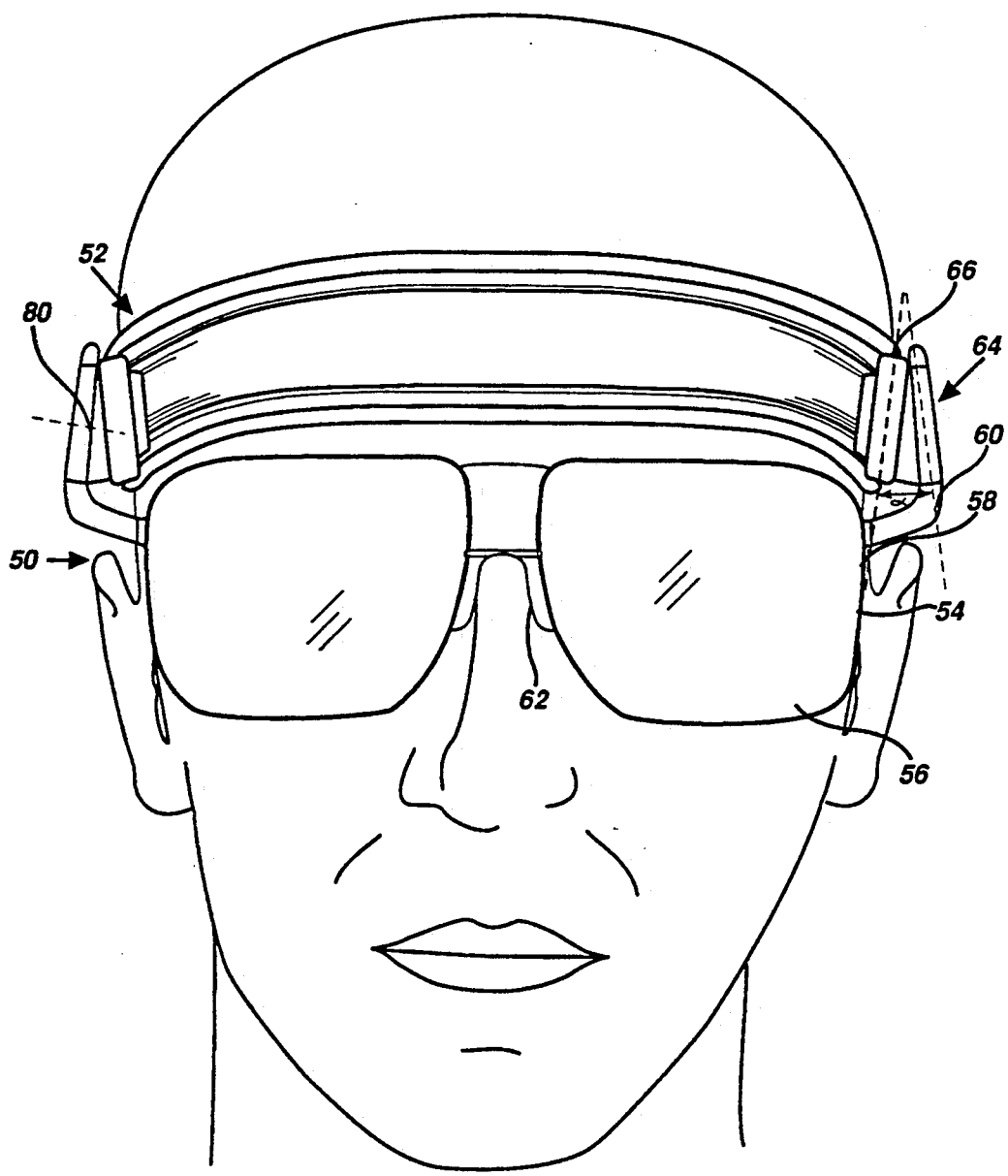
FIG. 1 is a front elevational view of the eyeglasses and headband combination worn by a user.
Figure 2:
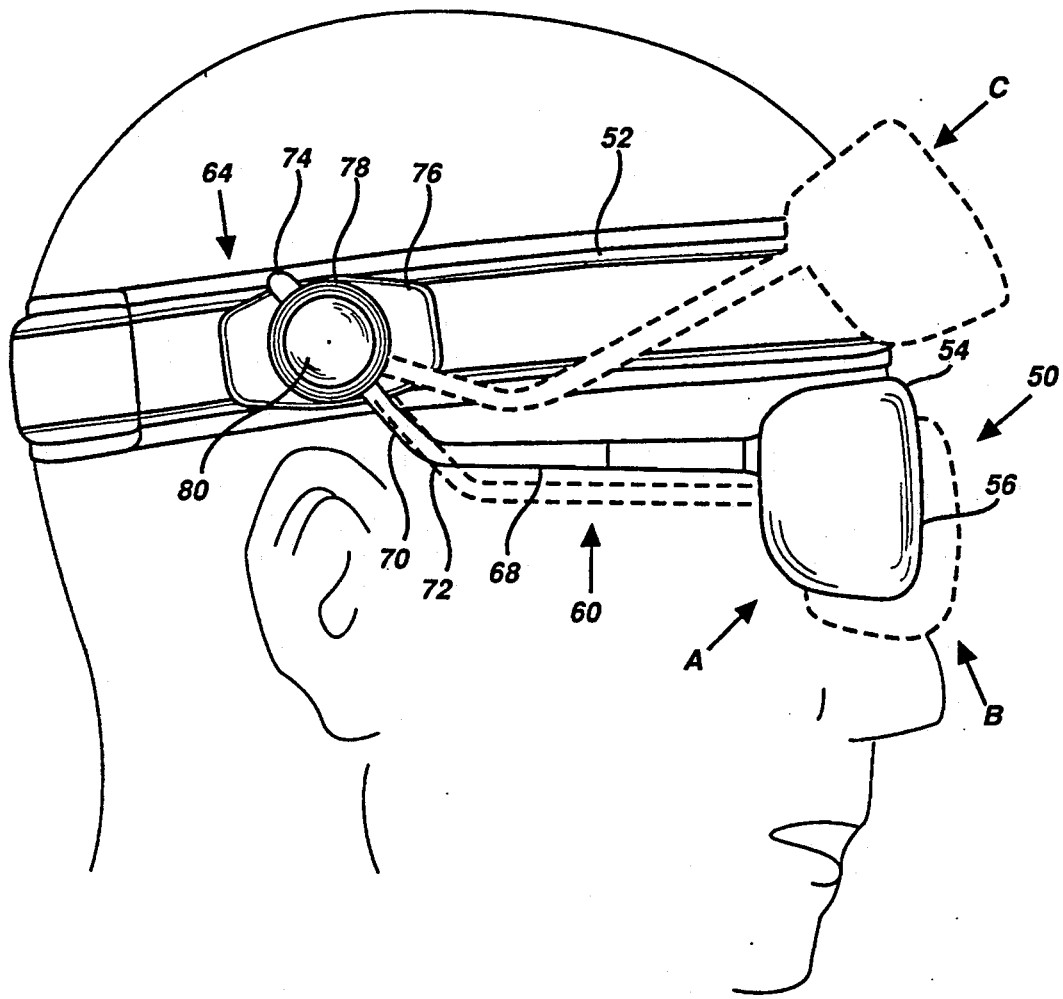
FIG. 2 is a side elevational view of FIG. 1.

An eyeglasses and headgear combination includes eyeglasses 50 and headgear 52, as illustrated in FIGS. 1 and 2. The headgear 52, as illustrated, is a headband; however, any other headgear, such as a cap, bandanna, ear warmer, ski gear, helmet or other headgear, is usable as the headgear of this invention. The eyeglasses include a frame 54 and lenses 56. The lenses 56 may be prescription, sunglass, protective or other lenses, as selected by the user. The frame 54 includes a front member 58, a temple member 60 and, optionally, a bridge 62. The front member 58 retains the lenses 56 and the bridge 62. Other eyewear comprised of fewer or more components may function equally well in combination with the headgear.

The temple member 60 includes a body portion 68 and a tip portion 70. The body portion 68 is coupled to the front member 58 and extends substantially horizontal. The temple member 60 bends at elbow 72, and includes a tip portion 70 extending from below the elbow 72 to the distal end 74 of the temple member 60. The temple member 60 is pivotally coupled about a vertical axis, generally with hinges, to the front member 58 to fold the temples 60 parallel to the front member 58, as is known in the art. When the eyeglasses alone are in use, the temple member extends from the front member along the side of the user's head and over the ears, as is known in the art.

When the eyeglasses 50 are worn in combination with the headgear 52, a coupling member 64 couples the temple member 60 to the headgear 52. The coupling member 64 includes a wedge member 66. The wedge member 66 is tapered, being thicker at the bottom, nearer the ear of the user, and more narrow toward the top. The coupling member 64 includes a headgear attachment member 76 and a pivoting member 78. The tip portion 70 is coupled to the pivoting member 78 to permit the eyeglasses to be pivoted upward, as shown by the dotted line Position C of FIG. 2. The pivoting member 78 pivots about axis 80. The pivot axis 80 is near the center of the headband, well above the ear of the user to ensure that the eyeglasses do not interfere with or rub against the ear of the user when pivoted.

As shown in FIG. 1, when the temple members 60 are coupled to the coupling member, they do not rest against the ear or contact the sides of the head of the user. Rather, the temples 60 are attached to the coupling member and are spaced away from the ear and side of the head of the user to avoid rubbing and to provide comfort. The wedge member is at an angle alpha with respect to the vertical. The wedge member 66 keeps the eyeglasses and coupling member properly aligned for comfort and aesthetics.

Figure 3:
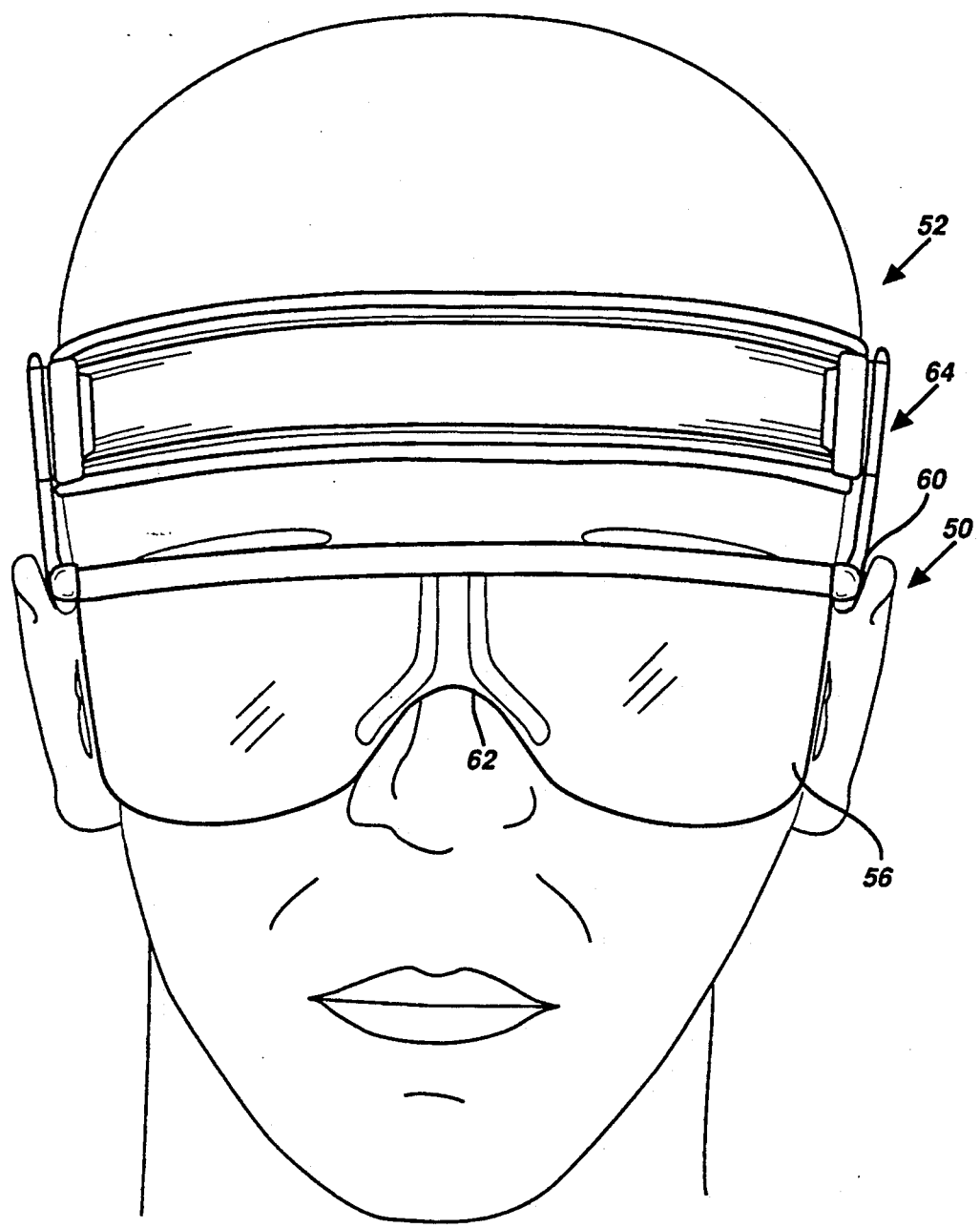
FIG. 3 is a front elevational view of an alternative embodiment of the eyeglasses and headgear combination worn by a user.

Alternatively, the coupling member 64 may be used without the wedge member 66, as illustrated in FIG. 3. The embodiment of FIG. 3 is particularly advantageous when the temple tips are removed rather than rotated. In the alternative embodiment, also shown in FIG. 18, the temple member 60 terminates before the ear of the user to avoid rubbing or discomfort even though the temple member is extending straight along the side of the head.

Figure 4:
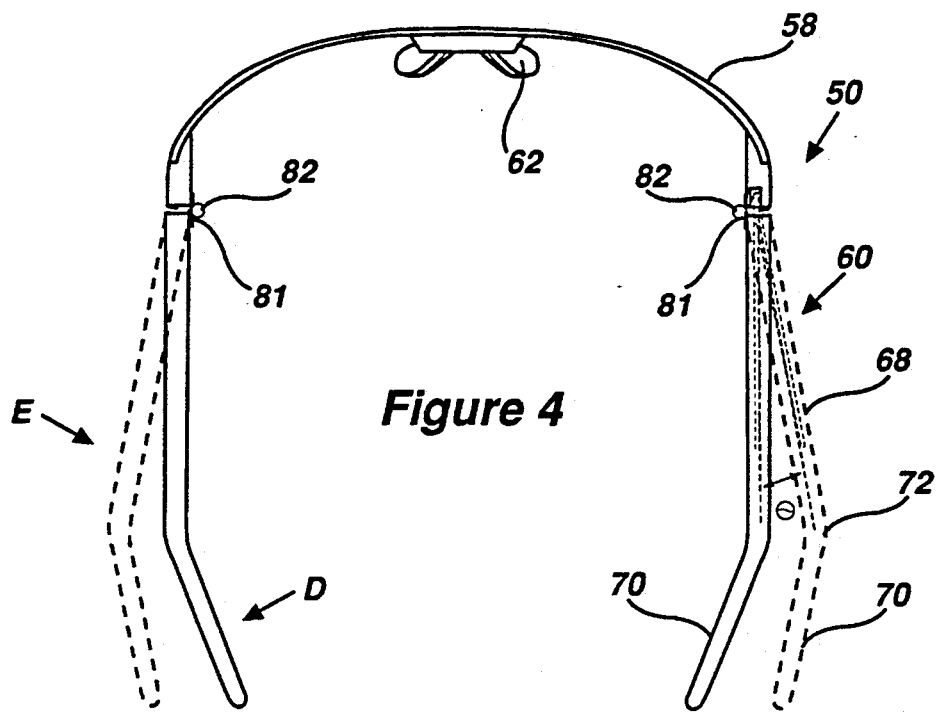
FIG. 4 is a top plan view of the eyeglasses showing the temple in either the up or down position.
Figure 5:
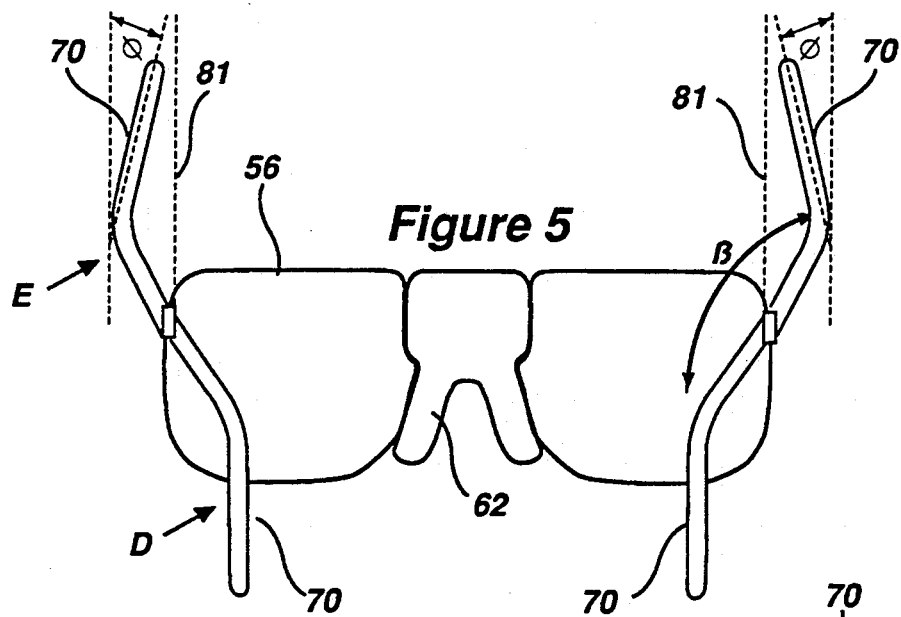
FIG. 5 is a rear elevational view of FIG. 4.

The eyeglasses 50 and the alternative positions of the temple member 60 are illustrated in FIGS. 4-6 and 44. The temple member 60 is coupled to rotate about vertical axis 81 at hinge 82 to the front member 58 as is well known in the art. When the eyeglasses 50 are worn by a user without the headgear, the temple tip portion 70 extends downward for positioning behind the ear of the user to hold the eyeglasses on the face, as is known in the art and shown as Position D in FIGS. 4-6. When the eyeglasses are worn in combination with the headgear, the tip portion 70 extends upward, towards the top of the user's head for attaching the eyeglasses to the headgear, shown as Position E in FIGS. 4-6. The tip portion 70 is positioned upward by rotating the temple member about a horizontal axis by an angle $\beta$. The tip portion moves from a position pointing downward for placing behind the ear to a position pointing upward for attaching to the headgear, as shown in FIG. 5. The tip portion 70 points upward at an angle $\phi$ with respect to the vertical after the temple member has been rotated by an angle $\beta$. The angle $\phi$ is selected to be approximately 15° but may be in the range of 5°-15°. The angle $\phi$ may be 0° in some embodiments, as is shown in FIG. 3. The angle $\phi$ is also selected to align the temple with the coupling member 64 and thus will vary depending on the angle $\alpha$ of the coupling member. The angle $\beta$ is generally in the range of 120°-130°, but will vary for each type of eyeglasses, in order to achieve the desired angle $\phi$.

When the temple member 60 is rotated through the angle $\beta$ to position the tip portion 70 extending upward at an angle $\phi$, the temple member 60 also extends outward by an angle $\theta$ greater than the previous angle with respect to the front member 58. The angle $\theta$ is sufficiently large to permit the temple both to clear the headgear and to be spaced sufficiently from the ear and head of the user that it does not rub on the ear or head, causing discomfort. An angle of 15° has been found suitable for $\theta$ based on the standard length of eyeglasses, a standard headband and design of temple member 60. However, the angle $\theta$ may be any value in the range of 0° to 20°, depending on the particular design of the temple member 60, the position of the elbow 72 and the like. The angle $\theta$ is also selected to ensure that the tip portion aligns with the coupling member of the headgear. For a thin headband, the angle $\theta$ may be between 0° and 10° whereas, for a cap or thicker headband, the angle may be in the range of 15°-20°.

Figure 6:
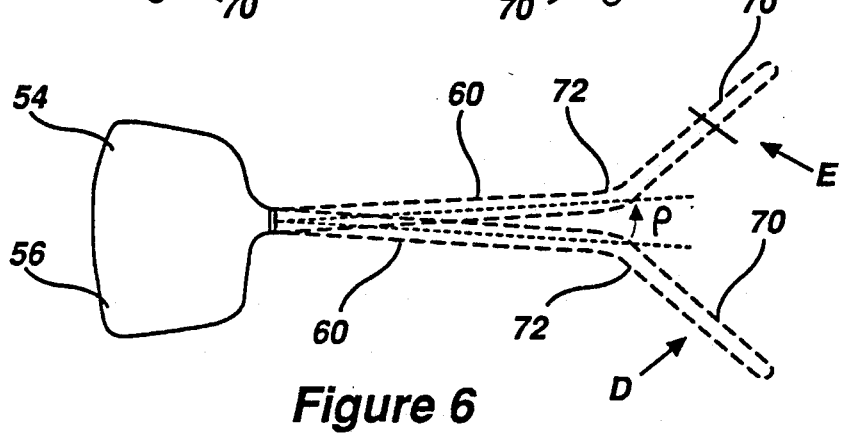
FIG. 6 is a side elevational view of FIG. 4.

When the temple member 60 is rotated about the horizontal axis by the angle $\beta$, the temple also extends slightly upward from the horizontal position by an angle $\rho$, as shown in FIG. 6. The size of the angle $\rho$ is selected to ensure that the lenses and bridge remain properly positioned on the face of the user when the eyeglasses are coupled to the headgear. With the eyeglasses supported on the headgear well above the nose, the bridge member 62 might otherwise be forced into the nose, putting pressure on the bridge of the nose and causing discomfort. Also, the frame 54 and lenses 56 might otherwise cant impermissibly with respect to the face or be held off of the face, farther from the eyes of the user than the design of the lenses intended. These problems are avoided by the design of this invention. The angle $\rho$ is selected based on the design of the eyeglasses, headgear and other features to ensure that the eyeglasses remain properly positioned on the face while not causing discomfort to the user. The angle $\rho$ is generally in the range of 2°-5°, but may be smaller or greater if desired.

Moving the temple 60 to different angular positions, such as $\theta$ and $\rho$, when using the eyeglasses in combination with the headgear reduces stress on the component parts, adds to the user's comfort and maintains the appropriate relationship of eyeglasses to the face. The present invention thus permits the same pair of eyeglasses to fit properly on the face whether worn alone or in combination with the headgear. This is important for both aesthetic and practical reasons, particularly where prescription lenses are involved. Further advantages and comfort are provided by having the tips positionable at an angle $\phi$ to permit the tips to mate with the headgear of a specific width, such as a cap or headband and provide comfort to the user.

The temple 60 may be coupled to the front 54 with a spring-loaded hinge (not shown), as is well known in the art, to permit the temple to extend outward at the desired angle $\theta$. Spring-loaded hinges are now used in glasses to extend the life of the frame by permitting the temple to flex resiliently outward under force, away from the sides of a person's head, and return to the correct position when the force is removed. Using a spring-loaded hinge permits the angle $\theta$ to assume any one of a plurality of angles, depending on the headgear and other factors. While use of a spring-loaded hinge coupling the temple to the front is known, rotating the tip with respect to the frame for attaching to headgear in combination with the spring-loaded hinge is not known.

Figure 44:
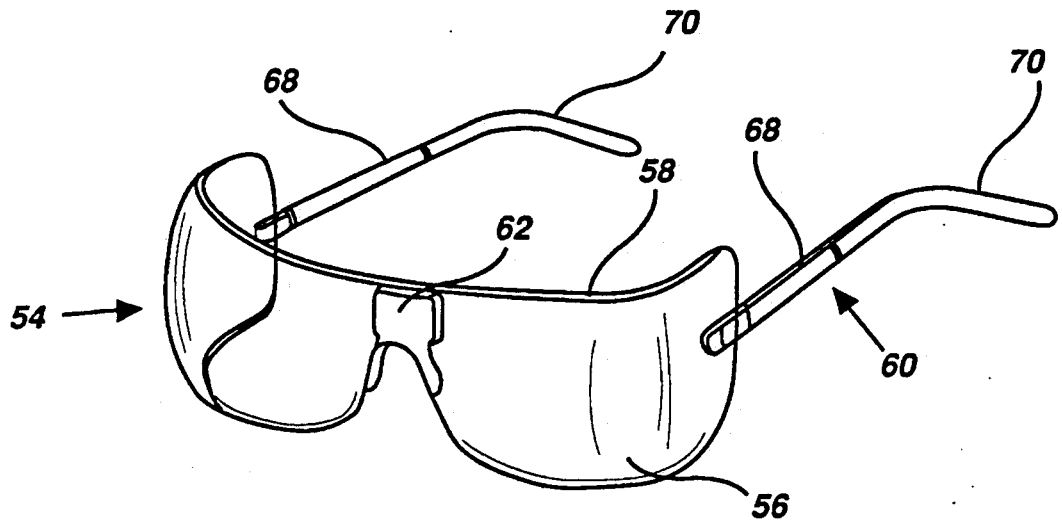
FIG. 44 is an isometric view of the eyeglasses alone.
Figure 45:
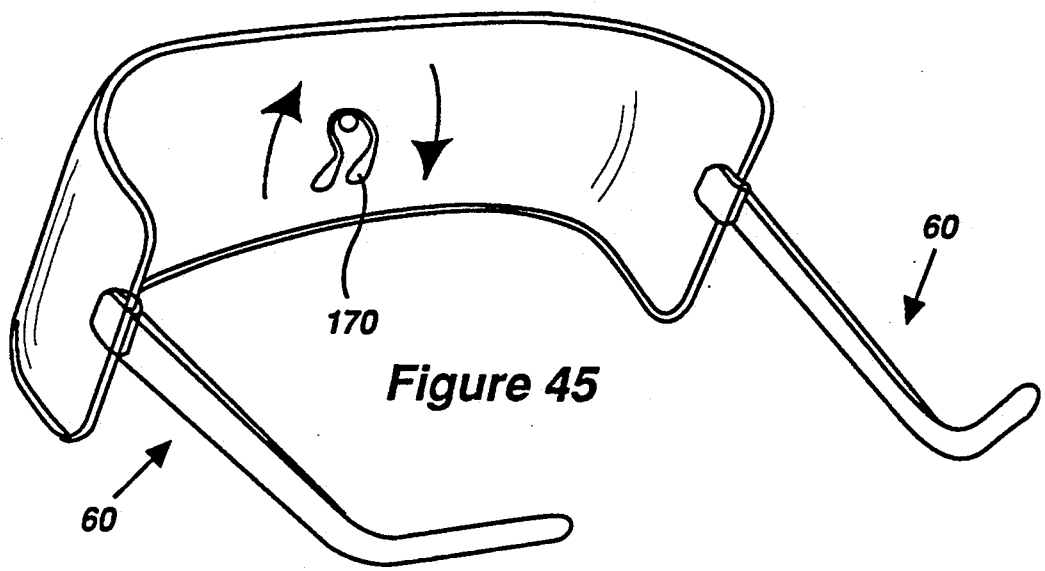
FIG. 45 is an isometric view of an alternative embodiment of the eyeglasses.

The eyeglasses 50 may be worn alone in the same manner as conventional eyeglasses, as shown in FIGS. 44 and 45. When the eyeglasses are worn alone, the tip 70 extends downward for positioning behind the ear.

The eyeglasses 50 may also be worn in combination with the headgear 52. When wearing the eyeglasses 50 in combination with the headgear 52, the eyeglasses are first removed from the face of the user. The user then rotates, by hand, the temple member 60 by an angle $\beta$ until the tip portion 70 extends upward at an angle $\phi$ with respect to the vertical. Simultaneous with rotating the tip portion by an angle $\beta$, the temple member 60 moves outward by an angle $\theta$, from the previous position, as shown in FIGS. 4 and 5. The member 60 may also move upward at the angle $\rho$. The user then couples the tip 70 to the coupling member 64. The user attaches the coupling member 64 to the headgear 52 at a comfortable position so that the eyeglasses are appropriately positioned with respect to his eyes, nose and head.

With the glasses supported by the headgear, they are positioned on the user's face and the temples spaced from the ears and sides of the head of the user, Position A of FIG. 2. The eyeglasses are positioned to ensure that the temple 60 does not rub against the sides of the person's head, creating discomfort or difficulty while he is engaging in the athletic activity. The front member 58 is firmly held in the correct position by the headgear rather than by contacting the ears. The user may comfortably wear the glasses in Position A for an extended period of time. A significant advantage provided by this invention is that the glasses do not rely on either the nose or the ears for support of their full weight. The weight of the glasses above the ears is supported by the headgear, not the ears. The temples do not rub behind the ears. A portion of the weight of the frames, in some designs, may be supported on the nose. However, if the bridges should begin to slip down the nose, the entire weight of the eyeglasses will be supported by the headgear, through the temple member. In some designs, the full weight of the eyeglasses is supported by the headgear, through the temple. Even though the user may have significant moisture on his face, be it from rain, perspiration or the like, the eyeglasses are held in the proper position.

Figure 24:
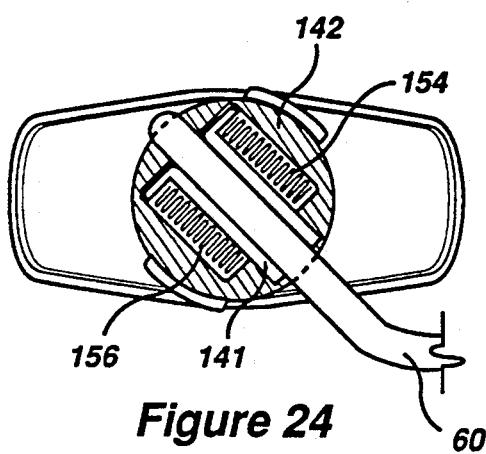
FIG. 24 is a cross-sectional view of the coupling member while the glasses are being worn.
Figure 25:
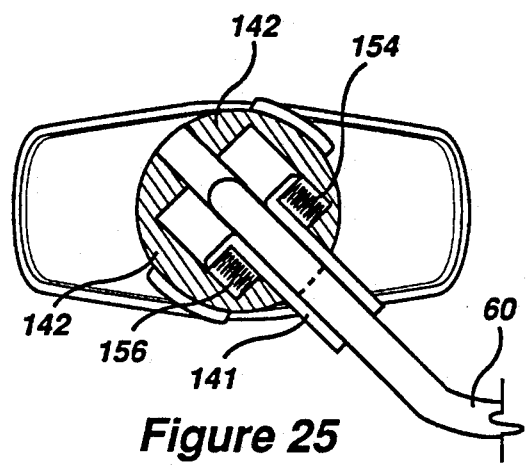
FIG. 25 is a cross-sectional view of the coupling member just prior to flipping the glasses up with the spring depressed.
Figure 42:
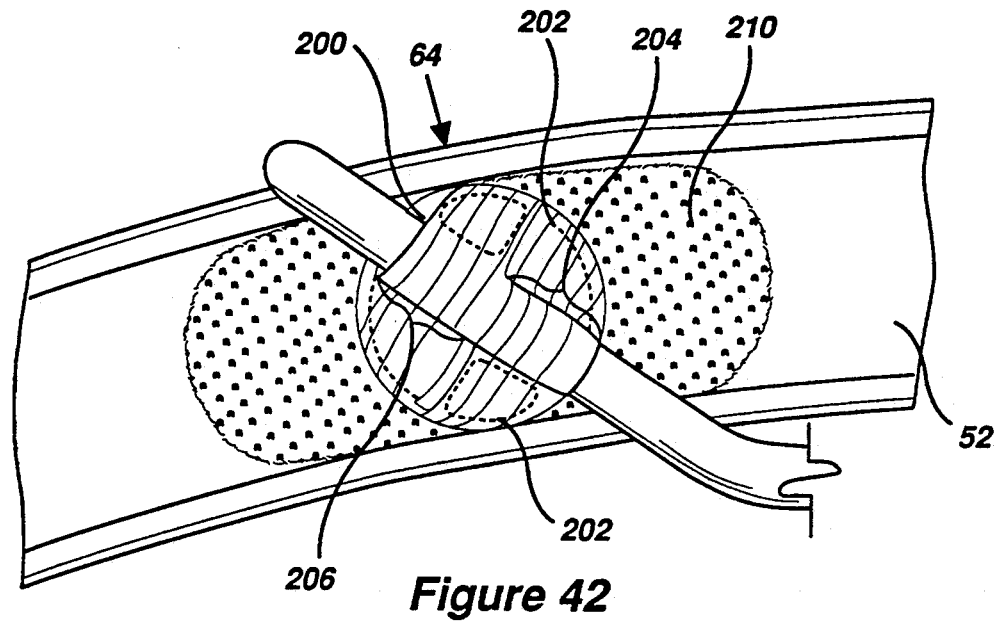
FIG. 42 is an alternative embodiment of the coupling member.
Figure 43A:
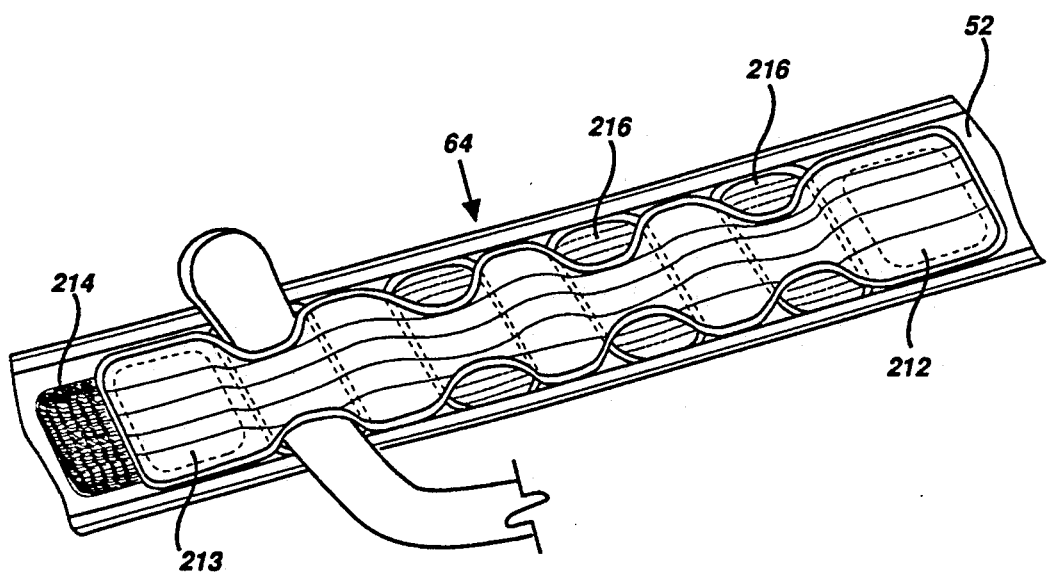
FIG. 43a is an alternative embodiment of the coupling member.

In the event the user wishes to move the lenses 56 out of his eyesight, for example, to remove sweat from his face, to vent fogging or when wearing sunglasses and going indoors, the user may pivot the eyeglasses upward, above his field of vision. The user moves the eyeglasses upward by pulling the frame downwards and forward, away from his face to provide clearance of his eyebrows, forehead and headgear, as shown in dotted lines in FIG. 2, Position B. The downward motion may be permitted by a sliding of the tip 70 within the coupling 64 or by resilient spring bias members within the coupling member 64, as shown in FIGS. 24 and 25 and hereinafter described. The user then moves the eyeglasses upward by rotating them about axis 80 in the coupling member 64 into Position C. The eyeglasses remain out of the field of vision of the user in a stable position, resting either against the headgear, forehead, the head of the user or in the air. Stable positions are effected by friction, positive stops in the pivoting member 78 or pressure provided by the elasticity of the headgear or the alternative coupling mechanisms, as shown in FIGS. 42 and 43. When the user desires to place the lenses within his line of sight again, he grips the frames firmly, pulling them downward and positions them comfortably on his face once again.

The features of the invention having been described in broad terms, the specific structure which accomplishes these features will now be described. Alternative temple members, structures for coupling temple members to the front member and coupling members for attaching the temple members to the headgear will be described.

FIGS. 7-17 illustrate alternative structures which permit the temple member 60 to rotate by an angle $\beta$ while simultaneously permitting it to move outward at the angle $\theta$ and upward at an angle $\rho$.

Figure 7:
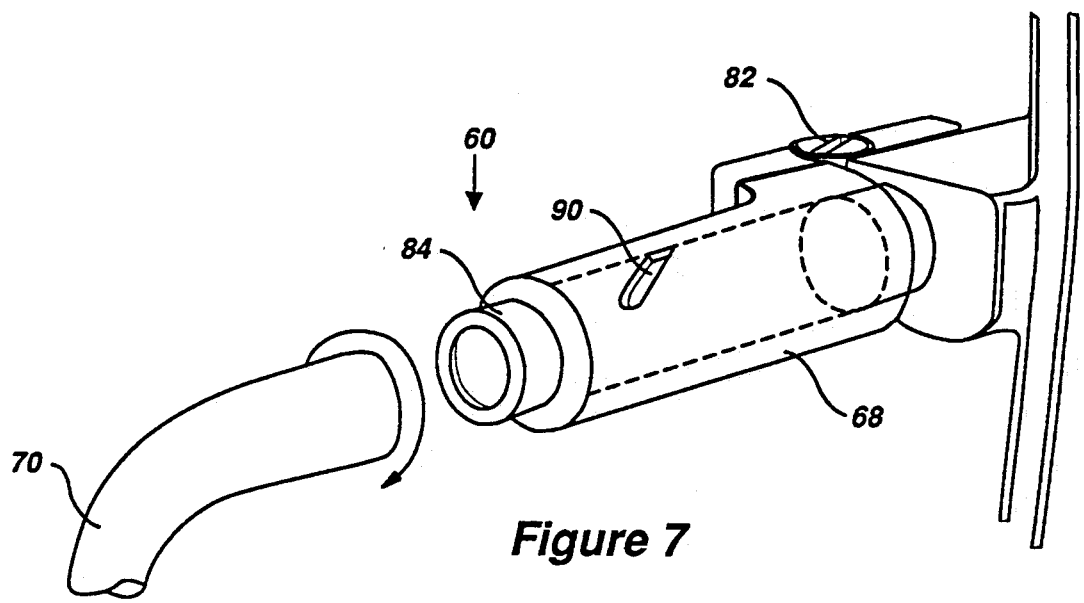
FIG. 7 is an isometric view of an alternative embodiment of a rotatable temple member coupled to the front member.
Figure 8:
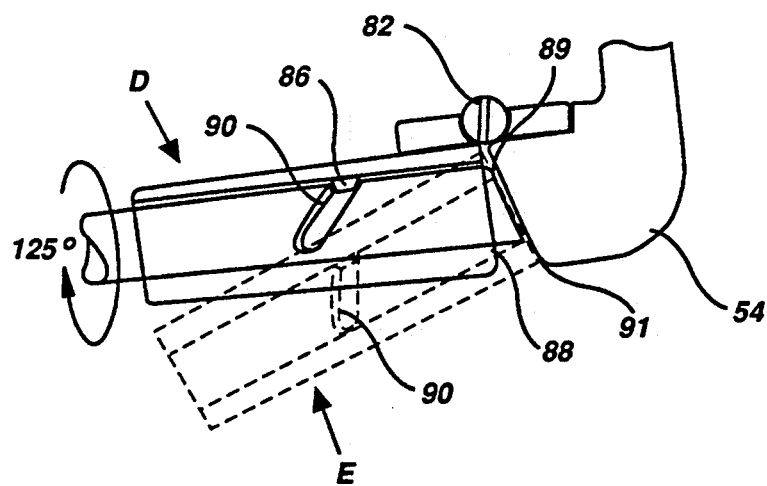
FIG. 8 is a top plan view of FIG. 7.
Figure 13A:
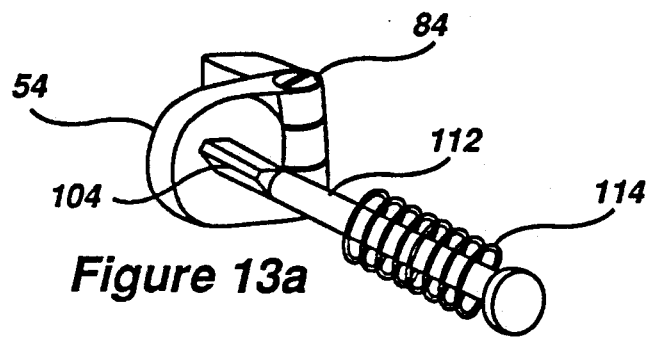
FIG. 13 is an isometric, exploded view of an alternative embodiment of a metal temple member for coupling to a metal front member.
Figure 13B:
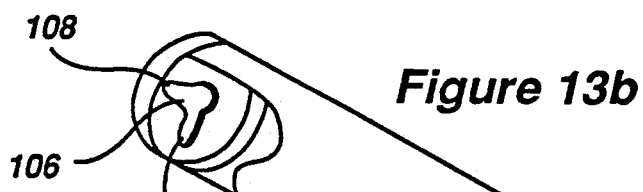

FIGS. 7 and 8 illustrate a first embodiment of a rotatable temple member 60. In the embodiment of FIG. 7, the body portion 68 remains stationary and only the tip portion 70 rotates. A rod 84 extends centrally from the tip portion 70 through body portion 68. The rod 84 includes a channel 90 which follows a track 86 within body portion 68. The rod 84 extends completely through the body portion 68 to abut against the front member 58. The rod end surface 89 is tapered to retain the temple member 60 substantially perpendicular to the front 58 when the eyeglasses are being worn with the tip portion 70 extending downward, as shown in FIG. 8, Position D. The front mating surface 91 is also tapered to form a mating surface for the rod end 89. The surface 91 is tapered along the face which contacts the temple surface 88 at an angle to produce the desired angle $\theta$, as previously described and shown in FIGS. 4 and 5. Alternatively, surface 88 may be tapered to produce the desired angle $\theta$. The mating surfaces 88 and 91 may also be tapered to provide a desired angle $\rho$ when the tip has rotated the proper angle $\beta$. The channel 90 is sized and shaped to place the tip portion 70 at the correct angle while retracting the rod within the body member.

Rotating the tip portion 70 of the right temple member clockwise by the angle $\beta$ causes the tip to point upward for attaching to the headgear, Position E. Similarly, the tip portion 70 of the left temple member is rotatable counterclockwise through the angle $\beta$ to point the tip upward. Of course, the temple member could be constructed to permit the tip portion to be rotated in either direction to position it pointing upward. The rod 84, following track 86, retracts away from the front surface 91, permitting the surface 88 of body portion 68 to abut against the front surface 91. The slopes of the surfaces 89 and 91 determine the angle of the temple with respect to the front when the tip is pointing downward. The slopes of the surfaces on 88 and 91 determine the angle of the temple with respect to the front when the tip is pointing upward.

In an alternative embodiment, the temple member 60 is rotatably coupled to the front 58 in the manner shown in FIGS. 9-11. A rotatable coupling 93 includes a spring 92 and a cam 94. The cam 94 is shaped to position the temple member 60 at the desired angle, substantially perpendicular to the front 58 when the eyeglasses are worn alone, the tip portion pointing down, and at the angles of $\theta$ and $\rho$, as shown in FIGS. 4 and 6, when the eyeglasses are worn in combination with the headgear, the tip portion pointing up. The coupling 93 fits within the cavity 94 of the front 58 and is covered by a cover member 96. The cover member 96 covers the cam 94 along bottom and outside surfaces. The cam 94 is shaped to abut against the cover 96 to force the temple 60 upward at an angle $\rho$ simultaneously with abutting against the wall 97 of the front 58 to force it outward at an angle $\theta$. The embodiment of FIGS. 9-12 requires the temple to extend outward at angle $\theta$ by pressing the cam surface against wall 97 of the front member, while the embodiment of FIGS. 7 and 8 permits the temple to extend outward, without requiring it move outward.

A wide variety of cam surfaces, such as those shown in FIGS. 10 and 11, may be used to achieve any desired angles of $\theta$ or $\rho$. The preferred shape of the cam surface 94 will vary depending upon the eyeglasses design and the headgear to be used in combination therewith. The shape of the cam is selected to provide the desired comfort to the user when the eyeglasses are worn alone and also when worn in combination with the headgear. Alternatively, the tip portion 70 may include a cam member 95 which rotates within the body portion 68, as shown in FIG. 12, to appropriately position the tip portion 70 with respect to the ear of the user or the headgear while leaving the position of the body portion 68 unchanged.

Figure 14:
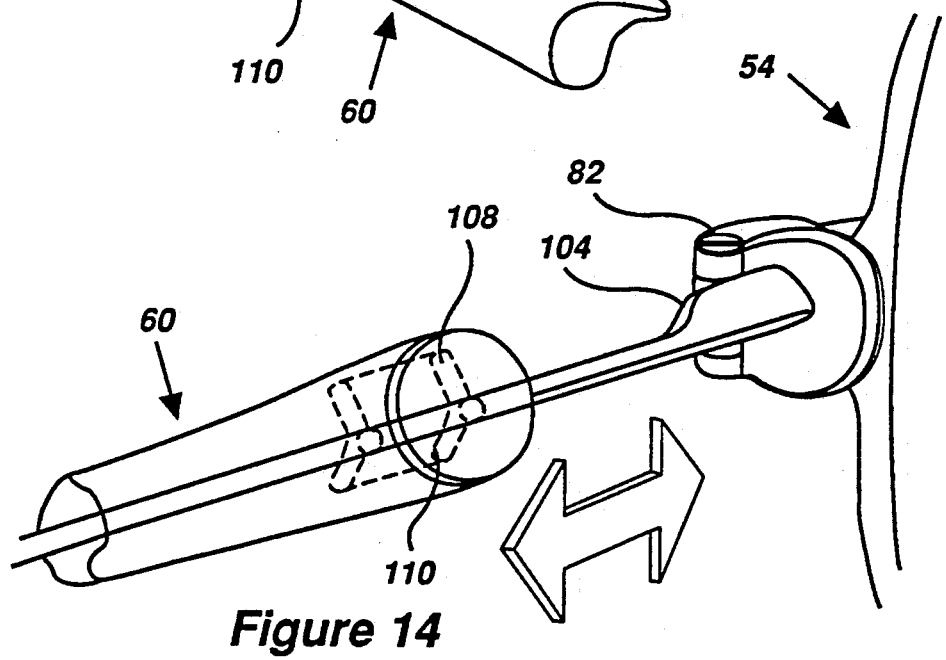
FIG. 14 is an isometric, operational view of the alternative embodiment of FIG. 13 having a plastic to metal fit.
Figure 15:
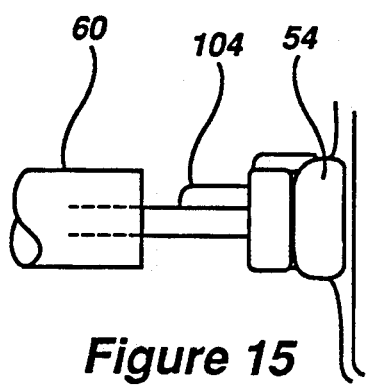
FIG. 15 is a side elevational view of the temple coupling of FIG. 14 in a position to permit rotation.
Figure 16:
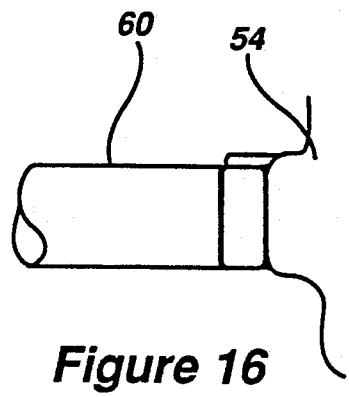
FIG. 16 is a side elevational view of the temple member of FIG. 14, locked in a nonrotatable position.

An alternative mechanism for rotatably coupling the temple 60 to the front 58 is shown in FIGS. 13-17. The temple member 60 is coupled to the front 58 with an internal locking member. A locking ridge 104 extends from the front 58 and is part of hinge member 82. The temple member 60 includes a slot 106 having keyways 108 and 110 for locking it in one of two alternative positions. The keyways 108 and 110 are placed the angle $\beta$ apart from each other, as previously described. When the eyeglasses are worn alone, the locking member 104 extends through the keyway 108 to lock the temple member 60 in position with the tip positioned behind the ear of the user. To rotate the temple 60, the temple member 60 is retracted along rod 112, being spring-biased forward by a spring 114. While the temple member 60 is retracted away from the locking member 104, as shown in FIGS. 14 and 15, the temple member 60 is rotated to a position aligning the keyway 110 with the locking member 104. The temple member 60 is then moved forward with the keyway 110 over the locking member 104 in the closed position, as shown in FIG. 16, with the temple tip extending upward for coupling to the headgear. The embodiments of FIGS. 13-17 may be used in combination with a sloped temple surface 88 and front surface 91, similar to those shown in FIGS. 7 and 8, to position the temple member 60 outward at an angle $\theta$ and upward at an angle $\rho$ if desired.

Figure 17:
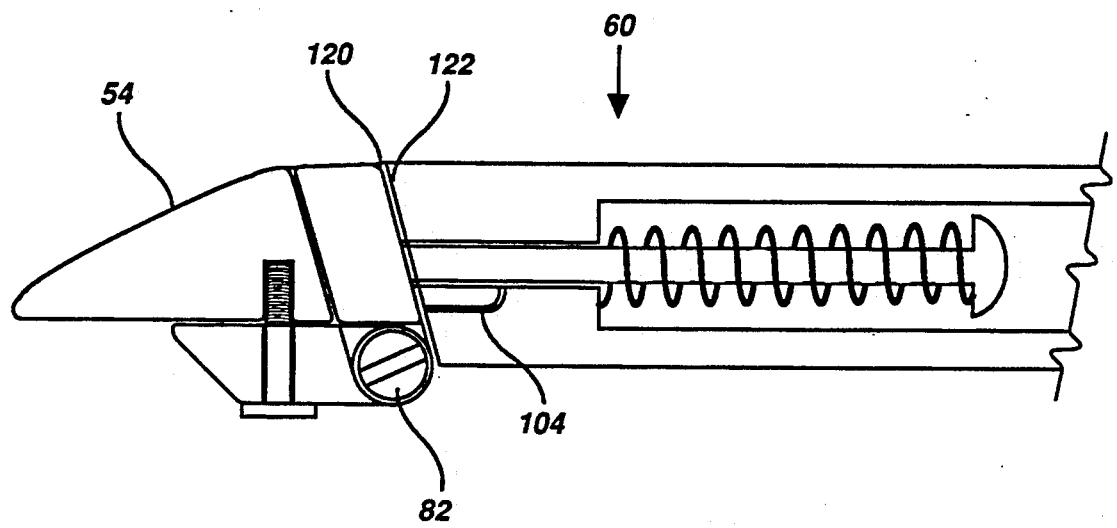
FIG. 17 is a top plan view of the temple member of FIG. 13.
Figure 21:
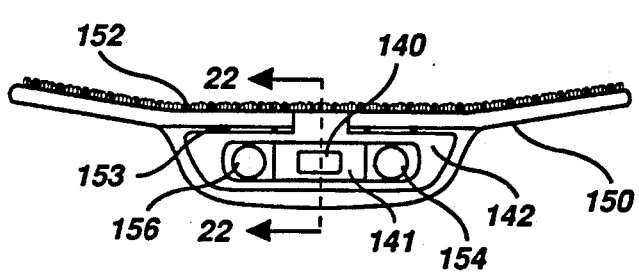
FIG. 21 is a top plan view of the coupling member.
Figure 22:
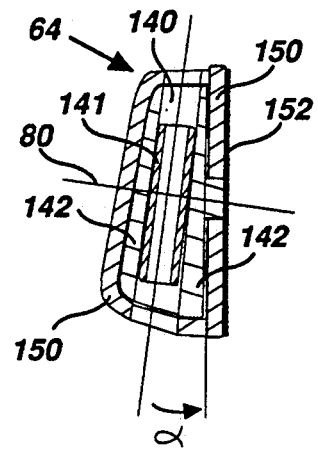
FIG. 22 is a cross-sectional view of the coupling member taken along lines 22—22 of FIG. 21.
Figure 23:
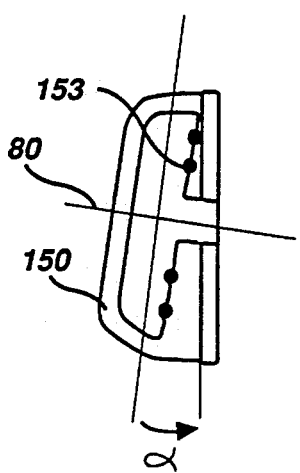
FIG. 23 is a partial cross-sectional view of FIG. 21 with the pivoting member removed.

The surface 120 of front 58 and the surface 122 of the temple member 60 may both include sloped members, as shown in FIG. 17. When the eyeglasses are in position to be worn behind the ear of the user, the sloped faces 120 and 122 mate to cause the temple 60 to extend generally perpendicular with respect to the hinge member 82 and the front 58. When the temple member 60 is rotated with the tip pointing upward, the sloped surfaces 120 and 122 force the temple member 60 to extend outward at an angle $\theta$ and upward at an angle $\rho$, as previously described. The sloping between respective surfaces 120 and 122 is selected to provide the desired angles $\theta$, $\phi$ and $\rho$, based on the particular eyeglass design, comfort of the user and other factors. The locking member 104 may or may not be required.

Figure 37:
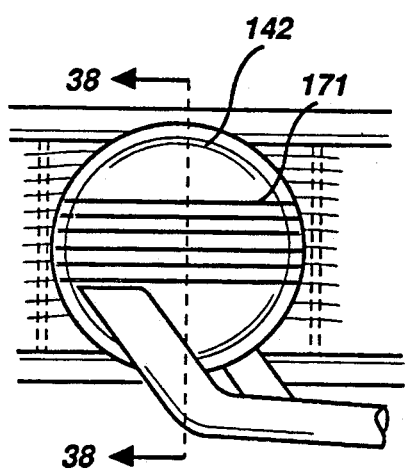
FIG. 37 is an alternative embodiment of the coupling member.
Figure 38:
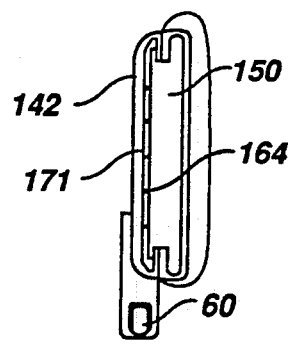
FIG. 38 is a cross-sectional view taken along lines 38—38 of FIG. 37.

FIGS. 18-20 illustrate an alternative temple 60 for coupling the eyeglasses alternatively to the head of the user or to the headgear of the user. According to this embodiment, the temple member 60 has a detachable tip 70 which is removably coupled to the body portion 68. The tip portion 70 is coupled to the temple member 60 when the eyeglasses are worn alone. When the eyeglasses are coupled to the headgear, the tip member 70 is removed from the member 60. The distal end of body portion 68 contains a plurality of holes 130 for coupling either to the protrusions 132 of the temple member 70 or the protrusions 134 of the coupling members 64. The body member 68 may be coupled at a variety of positions to the temple tip member 70 or the coupling member 64, depending upon the comfort and needs of the user. FIGS. 26, 27, 32-35, 37 and 38 also illustrate alternative coupling for the temple 60 to the headgear in which the tip 70 is removed from the temple body portion prior to coupling the eyeglasses 50 the headgear. The mating connection shown in FIGS. 31-35 is a tongue-and-groove arrangement; however, other mating connections, such as a centrally disposed rod coupling as shown in FIGS. 37 and 38 or the like, may be used to removably couple the tip 70 to the body 68.

The various embodiments of the temple member 60 and the structures for coupling to the front 58, as shown and described herein, may be used in various combinations with each other. For example, the embodiment of FIG. 7 may be used in combination with a cam surface of FIG. 14 if desired. Similarly, a locking member and keyway, as illustrated in FIGS. 13-17, may be used in combination with any of the other structures, such as the rod of FIG. 7, the cam of FIGS. 11-14 or the like.

Figure 27A:
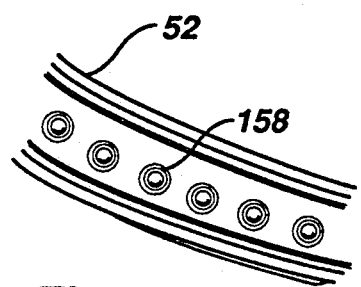
FIG. 27 is an isometric, exploded view of the coupling member of FIG. 26.
Figure 27B:
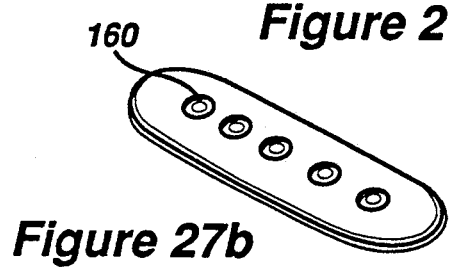
Figure 27C:
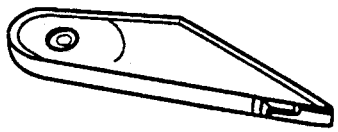

FIGS. 21-25 illustrate a first embodiment of a coupling member 64. The coupling 64 includes a wedge 66 tapered at an angle $\alpha$. The angle $\alpha$ is preferably equal to the angle $\phi$, though $\alpha$ and $\phi$ may be different if desired Alpha is approximately 15° and is preferably within the range of 12°-20°, though it may be somewhat smaller or greater if desired. The coupling 64 includes a rotating member 142 having a gripping member 141 with a slot 140 through which the tip extends. The tip is held in the slot 140 by a friction-fit or, alternatively, by a locking member. The rotating member 142 is rotatably coupled to rigid member 150. The rigid member 150 contains a coupling for removably connecting the coupling 64 to the headgear. Velcro TM is the preferred device for the coupling 152 for attaching the coupling member 64 to the headband, though other devices, such as straps, buckles, snaps or the like, as shown in FIG. 27, may be used.

The rotating member 142 is pivotable to a plurality of different positions and retains the eyeglasses in the selected position. A plurality of protrusions 153 in the rigid member 150 extend into mating indentations of the rotating member for holding the rotating member 142 in a selected position. Alternatively, a friction-fit between the rotating member 142 and the rigid member 150 may be used to provide sufficient force to hold the rotating member 142 and the eyeglasses 50 in any desired position.

The rotating member 142 includes spring members 154 and 156. The spring members 154 and 156 resiliently bias the eyeglasses toward the face of the user and firmly but comfortably hold them in position. When the user desires to move the glasses upward, he may pull the eyeglasses away from his face, depressing the springs 154 and 156, as shown in FIG. 25, and move them upward by rotating member 142 about axis 80. The springs permit the eyeglasses to clear the face of the user without requiring the user to alter the position of the tip 70 within the slot 140 of gripping member 141. The advantage of providing springs 154 and 156 is that the tip can be fixed within the slot 140. The eyeglasses may then be raised and lowered repeatedly, each time returning to the use position first selected without further readjustment. The front 59 contacts the face because springs 156 and 154 bias the glasses towards the nose, but the full weight of the eyeglasses is supportable by the headgear alone.

Figure 26:
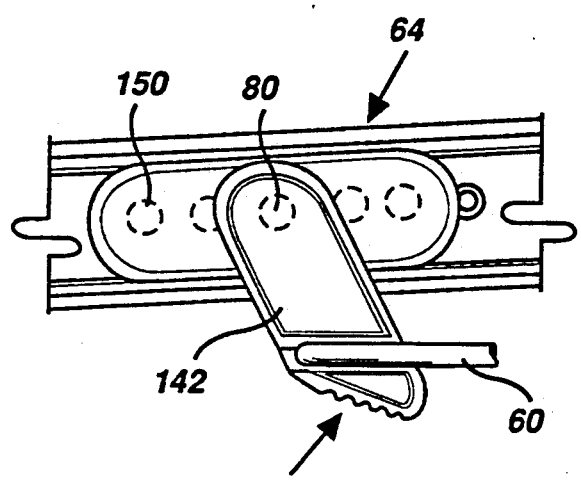
FIG. 26 is a side view of an alternative embodiment of the coupling member.

The connection of the tip 70 to the coupling member 64 and the coupling member 64 to the headgear 52 may be realized in several alternative embodiments, such as those shown in FIGS. 26-41. The coupling member 64 may be attached to the headgear using a plurality of snaps 158 and 160 on the headgear and coupling members, respectively, as shown in FIGS. 26 and 27. The coupling member is attachable to the headgear in a variety of fixed positions using the snaps, the desired position depending on the fit preferred by the user. The coupling member 64 may include a gripping surface 162 which the user may grip to aid in pivoting the rotating member 142 and the glasses upward.

Figure 28:
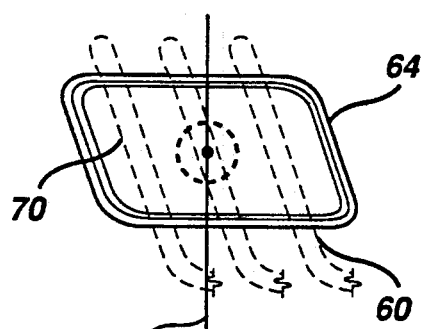
FIG. 28 is a side elevational view of an alternative embodiment of the coupling member.
Figure 29:
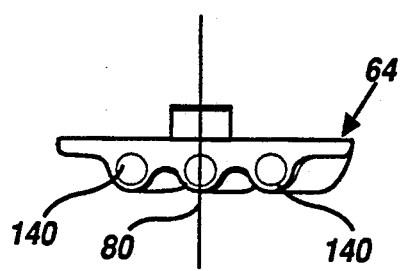
FIG. 29 is a top plan view of FIG. 28.

As shown in FIGS. 28 and 29, the coupling member 64 may include a plurality of slots 140 through any one of which the tip 70 may be placed, depending on the desired position of the glasses with respect to the user's face. The rotating member 142 may include a shaft 159 about which the member 142 rotates.

In some embodiments, the coupling member 64 is nonremovably coupled into the headgear, such as by sewing, as shown in FIGS. 30-33. The relationship of the glasses with respect to the user's face is adjustable by sliding the temple member 60 to a desired position in the coupling member 64, as illustrated in FIGS. 30 and 32. The fit between the temple member 60 and the coupling member 64 is a friction-fit and the glasses may be placed at a desired position with respect to the user's face by sliding the temples 60 within a tubing 103. When lifting the glasses upward, the glasses may be slid slightly forward out of coupling member 64 and then rotated upward to rest on the head of the user. The friction-fit may be a rod within a tubing, the temple 60 being the rod and the coupling member having the tubing 163, as illustrated in FIGS. 30, 31, 35, 37 and 38, or a tongue-and-groove arrangement, as illustrated in FIGS. 26 and 32-34. In the embodiment of FIGS. 32-34, the coupling member 64 may extend straight, the angle $\theta$ being zero, because the temple 60 terminates well before the ear, if desired.

Figure 35:
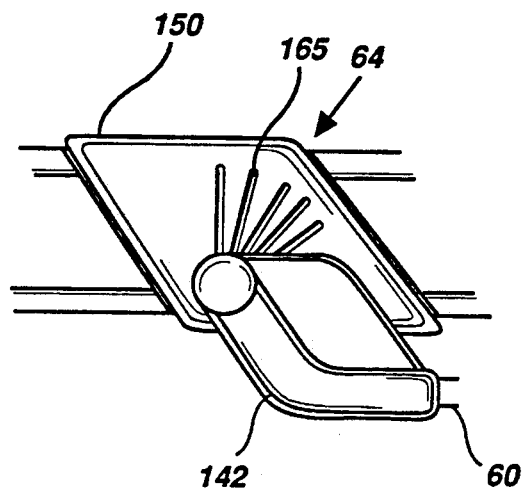
FIG. 35 is an alternative embodiment of the coupling member.
Figure 36:
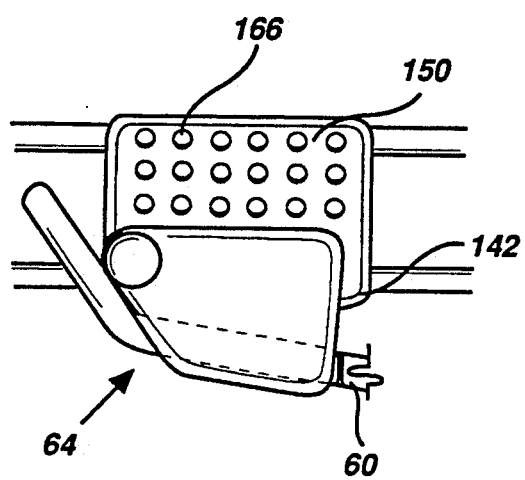
FIG. 36 is an alternative embodiment of the coupling member.

The glasses may be held in a variety of positions by the holding force between the rotating member 142 and the rigid member 150. Alternative embodiments of rotating members 142 and rigid members 150 are illustrated in FIGS. 35-41. The rotating member 142 may include a plurality of ridges (not shown) shaped to mate with slots 165 within the rigid member 150, as shown in FIG. 35. Alternatively, the rigid member 150 may include a plurality of protrusions 166 which mate with slots or indentations of the pivoting member 142, as shown in FIG. 36. Alternatively, the rigid member 150 may include a plurality of protrusions 169 which engage slots 171 of the rotating member 142, as shown in FIGS. 37-38.

In the embodiment of FIGS. 39-41, the coupling member 64 does not contain a rotating member 142; rather, the temple 60 rotates within the coupling member. A central protrusion 145 engages an indentation 143 in the tip portion 70. Indentations 143 engage mating protrusions 169 and 171 on the coupling member. With the eyeglasses in the down position, the tip engages the appropriate protrusions in the coupling member to hold the eyeglasses in the desired position, Position A. To move the front 58 upward, the tip 70 is rotated to mate with other protrusions while the coupling member 64 remains stationary. The eyeglasses are held in a desired Position C by the alignment of the protrusions in the tip 70 and the coupling member 64. The embodiment of FIGS. 39-41 has the advantage that fewer moving parts are required. The coupling member is a single rigid member that does not have a rotating member 142. The tip portion 70 moves within the coupling member 64 to achieve the desired position.

FIGS. 42, 43a, 43b and 43c illustrate coupling members without rigid mechanical parts. The coupling member 64 of FIG. 42 is made of elastic, standard cloth or a stretchable cloth material. Channel 200, through which the tip member 70 extends, is provided in the stretchable material. The tip member 70 is held in the channel 200 by a friction-fit. Alternatively, if the channel 200 is made slightly smaller in diameter than the tip 70, the coupling member material may be stretched further open to accept tip 70 and grip the tip 70 by resilient pressure. The material is cut and sewn into the desired shape for the coupling member, the dotted lines 202 representing sewn threads. An attaching member 210, preferably Velcro TM or a group of snaps, holds the coupling member 64 to the headgear 52. The backside of the coupling member 64 is a cloth material which readily attaches to Velcro TM surface 210 on the headgear. The Velcro TM area 210 is large enough to permit the coupling member to be attached at a plurality of positions. Alternatively, Velcro TM or a group of snaps may be placed on the back surface of the coupling member 64 to permit it to be attached at any desired position on a cloth headband or other headgear which is receptive to Velcro TM.

Because the coupling member 64 of FIG. 42 is a cloth or elastic material, the eyeglasses may be rotated upward without the use of mechanically engaging moving parts. When the eyeglasses are rotated upward, the tip portion rotates about axis 80 while the top section 204 and the bottom section 206 of the channel 200 stretch. The front of the eyeglasses may rest against the head of the user while being resiliently biased downward by the coupling member 64. Alternatively, the coupling member 64 may be removed or fitted onto the headgear in the new position, with the glasses in Position C.

Several advantages are obtained by using a cloth type of material for the coupling member 64. The material is thinner and lighter in weight than the rigid plastic member previously illustrated in FIGS. 1-41. Further, no special tooling is required to form the cloth coupling member, merely cutting with scissors and sewing using well-known techniques. The cloth-type material is also less costly and easier to alter than a plastic part.

FIG. 43 illustrates an alternative embodiment of a coupling member 64. In FIG. 43, the coupling member is made of a cloth, stretchable cloth, elastic or leather material. The coupling member is sewn into the headgear 52 at a forward section 212. The coupling member 64 is attachable at a rear location 213 to Velcro TM pad 214 or, alternatively, may be sewn in position. When the rear section 213 is removably attached, as by a snap or Velcro TM, the end 213 may be pulled away from the headgear, acting as a flap. The coupling member 64 includes a plurality of channels 216 through which the tip 70 may extend for holding the eyeglasses to the face, as has been described. The end 213 may be secured at one of a plurality of positions to place the eyeglasses in a desired position, the cloth material being stretchable. The eyeglasses may also be rotated upward because the material is stretchable, as described with respect to FIG. 42. The channels 216 of FIG. 43 and 200 of FIG. 42 may be made of one type of elastic material being more stretchable than the rest of the coupling member 64 to permit ease of rotation, if desired.

The embodiment of FIG. 43 has advantages similar to those described with respect to FIG. 42. Because the cloth-type material is elastic, the eyeglasses can easily be pulled down to a Position B before moving them to Position C, as shown in FIG. 2, if desired. Springs 154 and 156 provide the resilient biasing for Positions A and B in the rigid coupling member of the embodiment of FIGS. 24 and 25, but the stretchable cloth-type material provides the resilient biasing for Positions A and B in the embodiment of FIGS. 42 and 43. Alternatively, if the flap 64 is made of cloth or leather which is not elastic or stretchable, the channels 216 can be shaped to permit the glasses to rotate from Position A to Position C.

Figure 43B:
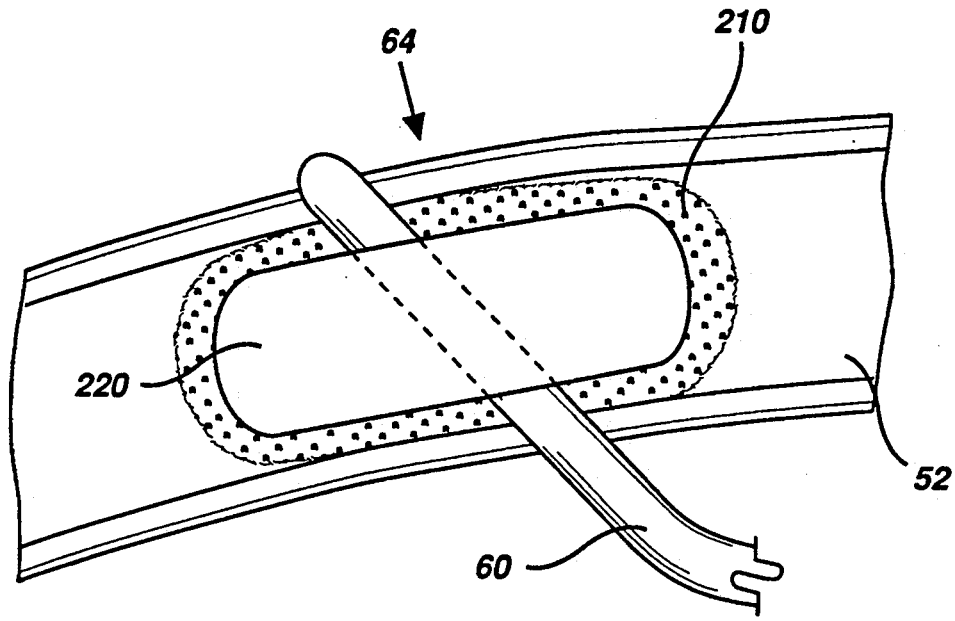
FIG. 43b is an alternative embodiment of the coupling member.

FIG. 43b illustrates an alternative embodiment for attaching the eyeglasses to the headgear 52. An attaching member 210, preferably of Velcro TM or snaps, is provided on the headgear 52. A strap of cloth or Velcro TM -receptive material 220 holds the temple 60 onto the headgear 52. The strap 220 frictionally engages the temple 60 by holding it tight against the headgear 52. The strap 220 is a separate member that is completely removable from the headgear 52. Alternatively, the strap 220 may be sewn into the headgear at one end, similar to the forward section 212 of FIG. 43a.

The user places the temple 60 in the appropriate position on the headgear 52 and, while holding the temple 60 with one hand, applies the strap 60 to the attaching member 210 with the other hand. The eyeglasses may be removed by removing the strap 220. Alternatively, the eyeglasses may be rotated upward and the strap 220 pressed into position at the new angle to hold the lenses out of the line of sight of the user.

Figure 43C:
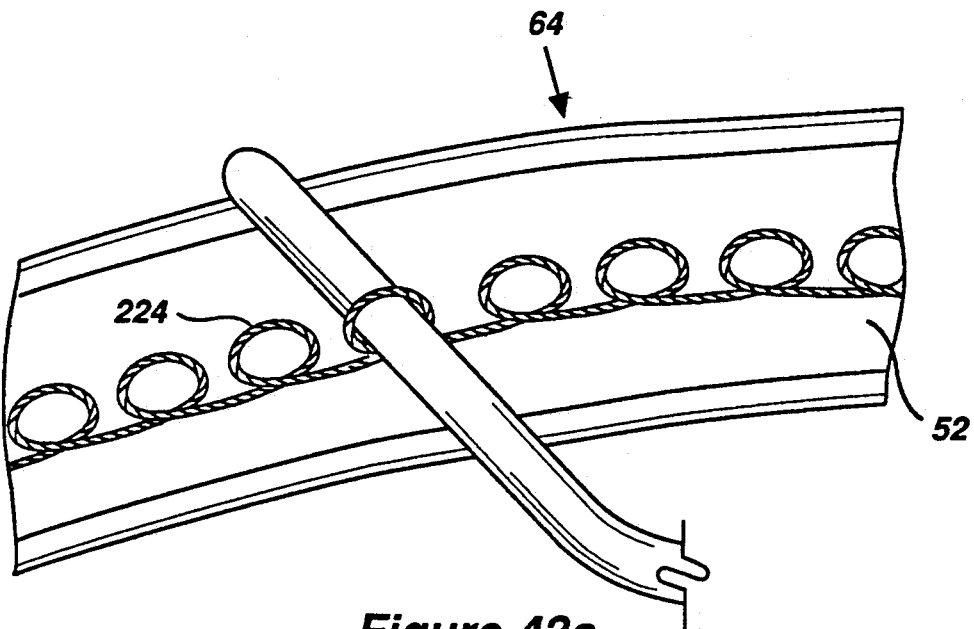
FIG. 43c is an alternative embodiment of the coupling member.

FIG. 43c illustrates an alternative coupling member 64 for attaching the temple 60 to the headgear 52. Loops 224 of material, either elastic, yarn, cotton or the like, are directly sewn into the headgear 52. The temples 60 are placed through the appropriate loops 224 and on each side of the head, respectively, to position the eyeglasses properly on the face. The loop 224 frictionally engages the temple 60 to hold the eyeglasses in position. The loops 224 have sufficient slack where they are sewn into the headgear to permit the eyeglasses to rotate upward, to Position C.

Figure 46:
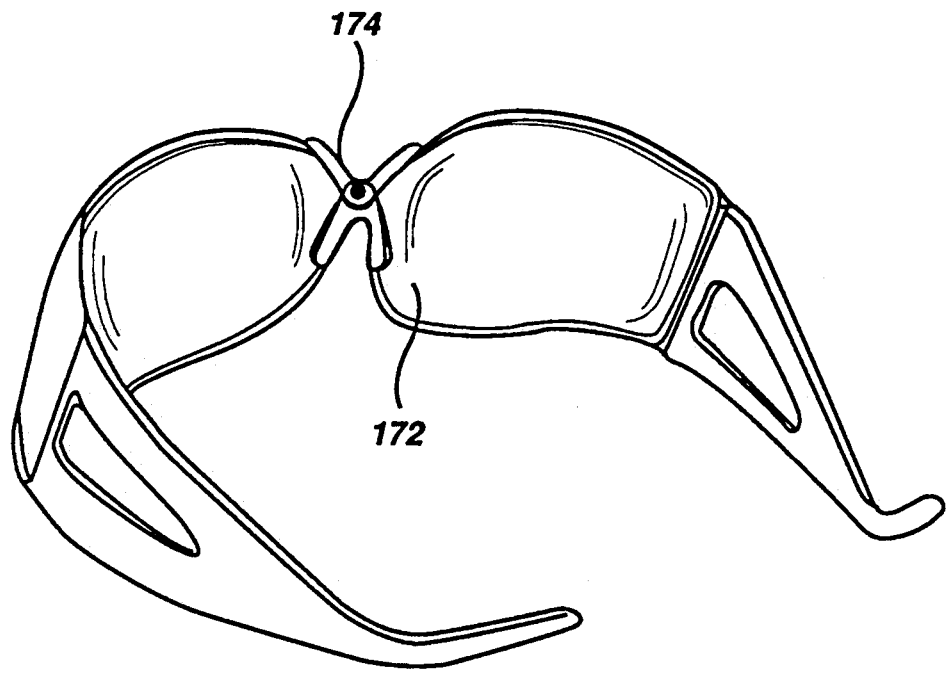
FIG. 46 is an isometric view of an alternative embodiment of the eyeglasses.
Figure 47:
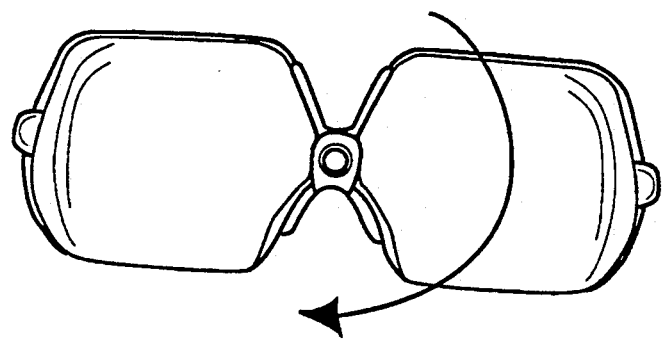
FIG. 47 is a front elevational view of FIG. 46.

The preferred embodiment for the eyeglasses used in combination with the headband is illustrated in FIG. 44. The eyeglasses include a rigid bridge member 62 and lenses 56 coupled to the front 58, as has been described. The relationship between the front 58, including bridge 62, lenses 56 and the face of the user remain the same whether the eyeglasses are being worn alone, supported by the ears of the user, or in combination with the headgear, supported by the headgear, providing significant comfort for the user and obviating the need to repeatedly adjust the eyeglasses. While the eyeglasses depicted in FIG. 44 have curved lenses, it is clear that the invention works equally well with any number of different styles of eyeglass frames and lenses currently available on the market. Alternatively, the entire glasses may be inverted, as illustrated in FIGS. 45-47. In the embodiment of FIGS. 45-47, the tip portion 70 is extended upward by rotating the eyeglasses as a whole. The temple 60 is coupled to the front 54 with a coupling that is not rotatable about a horizontal axis. To couple the eyeglasses to the headgear, the entire eyeglasses are rotated, the right temple becoming the left temple, to cause the tips to extend upward. In the embodiment of FIG. 45, the bridge member 170 is rotatable for positioning on the nose of the user, whether the eyeglasses are being used alone or in combination with the headgear. Alternatively, both the top and the bottom of the glasses may include a nosepiece 172, as illustrated in FIGS. 46, 47. The nosepiece 172 is shaped to be the most comfortable when the glasses are being worn in combination with the headgear. The nosepiece 174 is shaped to be the most comfortable when the glasses are being worn alone. The advantage of using two different nose ridges is that the glasses can be more comfortably fit to the user at all times, the bridges being significantly different from each other, if necessary.

The invention has been described with respect to a large variety of embodiments and combinations. A method and plurality of structures for coupling eyeglasses to headgear which are extremely comfortable yet rugged have been described. The headgear holds the front 58 in substantially the same position on the face as if the eyeglasses were being worn alone, providing a comfort not previously possible with such combinations. Any one of the alternative embodiments or portions thereof as disclosed here may be combined with any other of their alternative embodiments or their equivalents. Numerous equivalent structures which are not disclosed in the patent application fall within the scope of this invention, as would be obvious to those of ordinary skill in the art.

We claim:

1. An eyeglasses and headgear combination comprising:
   headgear attachable to the head of a user;
   eyeglasses attachable to said headgear, said eyeglasses including a front member, a lens, and temple members coupled to said front member, each of said temple members having a tip portion and a body portion, said tip portion being alternatively positionable extending downward or upward, the tip portion extending upward when said eyeglasses are attached to said headgear and said tip portion extending downward when said eyeglasses are attached behind said user's ear; and
   a coupling member means for attaching said tip portion of said eyeglasses to said headgear, said coupling member providing a coupling to said headgear which permits said front member to be pivoted upward, with said lenses out of the line of sight of said user.

2. The combination according to claim 1 wherein said tip portion projects upward when coupled to said headgear.

3. The combination according to claim 1 wherein the front and temple are rotated as a unit to alternatively position said tips extending upward or downward.

4. The apparatus according to claim 1 wherein temple member is rotatable about a horizontal axis with respect to said front.

5. The apparatus according to claim 1 wherein said temple member is rotatably coupled to said front.

6. The apparatus according to claim 1 wherein said tip portion is rotatable about a horizontal axis with respect to said temple body portion.

7. The apparatus according to claim 1 wherein said temple member extends generally perpendicular to said front when said tip is positioned extending downward and said temple member extends to an angle greater than 90° with respect to said front when said tip is positioned extending upward.

8. The apparatus according to claim 1 wherein said temple member is rotatable greater than 120°.

9. The apparatus according to claim 1 wherein said coupling member is pivotally attached to said headgear.

10. The apparatus according to claim 1 wherein said coupling member is an elastic cloth-type member which permits said temple member to rotate with respect to said headband with said coupling member remaining coupled to said headgear in a fitted relationship.

11. The apparatus according to claim 1 wherein said coupling member is fixedly coupled to said headgear and said temple member rotates within said coupling member.

12. The apparatus according to claim 1 wherein said temples contact said user, when said tip member is positioned extending downward, and do not contact said user when said tip member is positioned extending upward.

13. The apparatus according to claim 1 wherein said temple member includes a cam surface which contacts a wall of said front member causing said temple member to assume a first angle with respect to said front when said tip portion extends downward and to assume a second, greater angle with respect to said front when said tip portion extends upward.

14. The apparatus according to claim 1, further including a resilient biasing means in said coupling member for permitting said eyeglasses to move forward while coupled to said headgear.

15. The eyeglasses and headgear combination according to claim 1 wherein said coupling member is removably coupled to said headgear and is attachable at a plurality of different positions on said headgear to adjust the relationship between the eyeglasses and the face of a user.

16. The eyeglasses and headgear combination according to claim 1 wherein said removable coupling includes a Velcro TM strip coupled to said headgear and a Velcro TM -adhering material coupled to said headgear.

17. The method of coupling eyeglasses having temples which rotate about a horizontal axis relative to a front member, said eyeglasses being coupled to headgear comprising:

removing said eyeglasses from a user's head;
placing said headgear on said user's head;
rotating a temple member of said eyeglasses about a horizontal axis while maintaining said front member of said eyeglasses in a generally stationary position such that said temple member is rotated relative to said front member to vary the orientation in both a horizontal and vertical plane of a tip portion of said temple member relative to said front member; and
attaching said temple member to said headgear.

18. The method according to claim 17 wherein said step of attaching said temple member to said headgear includes the steps of:

attaching a coupling member to a tip portion of said temple member; and
attaching said coupling member to said headgear.

19. The method according to claim 18 wherein said coupling member includes a wedge member tapering inward toward the top of said user's head.

20. The method according to claim 17 wherein said step of rotating said temple member includes rotating said temple member with respect to a front member of said eyeglasses.

21. The method according to claim 19, further including altering the angle of said temple with respect to said front member simultaneously with rotating said temple member.

22. The method according to claim 17, further including pivoting said eyeglasses attached to said headgear out of said user's field of vision.

23. An eyeglasses and headgear combination comprising:

headgear attachable to the head of a user;
a frame member including lenses, a front and a pair of temple members;
each of said temple members including a tip portion and a body portion, said tip portion being rotatable about a horizontal axis relative to said front member to alternatively position said tip portion pointing downward for placing behind the ears of said user or pointing upward for coupling to said headgear worn by said user; and
a coupling member for attaching said temple member to said headgear.

24. The apparatus according to claim 23 wherein said coupling member includes a cloth strap and an attaching member on said headgear for receiving said cloth strap.

25. The apparatus according to claim 23 wherein said coupling member includes a loop of material fixed to said headgear, said loop of material frictionally engaging said temple member.

26. An eyeglasses and headgear combination comprising:

headgear attachable to the head of a user;
eyeglasses attachable to said headgear, said eyeglasses including a front member, a lens, and temple members coupled to said front member, each of said temple members having a tip portion and a body portion;
a coupling member means for attaching said tip portion of said eyeglasses to said headgear, said coupling member providing a coupling to said headgear which permits said front member to be pivoted upward, with said lenses out of the line of sight of said user; and
a resilient biasing means in said coupling member for permitting said eyeglasses to move forward while coupled to said headgear.

27. An eyeglasses and headgear combination comprising:

headgear attachable to the head of a user;
eyeglasses attachable to said headgear, said eyeglasses including a front member, a lens, and temple members coupled to said front member, each of said temple members having a tip portion and a body portion;
a coupling member means for attaching said tip portion of said eyeglasses to said headgear, said coupling member providing a coupling to said headgear which permits said front member to be pivoted upward, with said lenses out of the line of sight of said user, said coupling member including a wedge member tapering inward toward the top of said user's head.

28. An eyeglasses and headgear combination comprising:

headgear attachable to the head of a user;
eyeglasses attachable to said headgear, said eyeglasses including a front member, a lens, and temple members coupled to said front member, each of said temple having a tip member and a body portion, said tip member being removably coupled to said body portion for permitting said tip member to extend behind the ears of a user and permitting said tip member to be removed from said body member for coupling said body member to said headgear; and
a coupling member means for coupling said body portion of said eyeglasses to said headgear.

29. The eyeglasses and headgear combination according to claim 28, further including a plurality of apertures in said body portion and a plurality of mating protuberances in said coupling member for coupling said eyeglasses at alternative positions on said coupling member.

30. The eyeglasses and headgear combination according to claim 28 wherein said body portion is slidably coupled to said coupling member for permitting said eyeglasses to be slid toward or away from the face of a user while being held by said coupling member.

31. The eyeglasses and headgear combination according to claim 28 wherein said coupling member means includes:

a stationary member and a rotatable member coupled to said stationary member, said eyeglasses being coupled to said rotatable member; and
a plurality of protuberances on a mating surface between said stationary member and said rotating member for selectively holding said rotatable member in a fixed relationship with respect to said stationary member as selected by a user.

32. The eyeglasses and headgear combination according to claim 28 wherein the majority of the weight of the eyeglasses is supported by said headgear.

33. The eyeglasses and headgear combination according to claim 28 wherein said coupling member is removably coupled to said headgear and is attachable at a plurality of different positions on said headgear to adjust the relationship between the eyeglasses and the face of a user.

34. The eyeglasses and headgear combination according to claim 33 wherein said removable coupling includes a Velcro ™ strip coupled to said headgear and a Velcro ™-adhering material coupled to said headgear.

* * * * *

UNITED STATES PATENT AND TRADEMARK OFFICE
CERTIFICATE OF CORRECTION

PATENT NO. : 5,009,496

DATED : April 23, 1991

INVENTOR(S) : Kevin L. Falk et al.

It is certified that error appears in the above-identified patent and that said Letters Patent is hereby corrected as shown below:

In column 14, claim 4, after "wherein" please insert --said--.

In column 15, claim 16, lines 9 and 10, please delete "Velcro TM" and substitute therefor --Velcro$^{TM}$--.

In column 15, claim 21, line 40, please delete "claim 19" and substitute therefor --claim 20--.

In column 16, claim 28, line 40, after "temple" please insert --members--.

In column 18, claim 34, lines 6 and 7, please delete "Velcro TM" and substitute therefor --Velcro$^{TM}$--.

Signed and Sealed this

Thirteenth Day of October, 1992

*Attest:*

DOUGLAS B. COMER

*Attesting Officer*   Acting Commissioner of Patents and Trademarks